(12) United States Patent
Rodrigues et al.

(10) Patent No.: US 9,851,460 B1
(45) Date of Patent: Dec. 26, 2017

(54) APPARATUS AND METHOD FOR A HIGH-FLUX PHOTON-COUNTING SPECTRAL APPLICATION-SPECIFIC INTEGRATED CIRCUIT (ASIC) HAVING A CHARGE SUMMING MODE

(71) Applicant: TOSHIBA MEDICAL SYSTEMS CORPORATION, Otawara-shi (JP)

(72) Inventors: Miesher L. Rodrigues, Buffalo Grove, IL (US); Hao Yang, Redmond, WA (US); Jimmy Wang, Lincolnshire, IL (US)

(73) Assignee: TOSHIBA MEDICAL SYSTMES CORPORATION, Otawara-shi (JP)

( * ) Notice: Subject to any disclaimer, the term of this patent is extended or adjusted under 35 U.S.C. 154(b) by 0 days.

(21) Appl. No.: 15/258,550

(22) Filed: Sep. 7, 2016

(51) Int. Cl.
  *H01L 27/146* (2006.01)
  *G01T 7/00* (2006.01)

(52) U.S. Cl.
  CPC .................................. *G01T 7/005* (2013.01)

(58) Field of Classification Search
  CPC G01T 1/17; G01T 1/247; G01T 1/161; G01T 1/366
  See application file for complete search history.

(56) References Cited

U.S. PATENT DOCUMENTS

| | | | |
|---|---|---|---|
| 7,696,483 B2 | 4/2010 | Tkaczyk et al. | |
| 8,488,854 B2 | 7/2013 | Arenson et al. | |
| 2008/0265169 A1* | 10/2008 | Spartiotis | G01T 1/17 250/370.09 |
| 2009/0050818 A1* | 2/2009 | Eversmann | G01T 1/247 250/389 |
| 2011/0168909 A1* | 7/2011 | Nakao | G01T 1/247 250/370.09 |
| 2015/0090893 A1 | 4/2015 | Spahn | |
| 2015/0243022 A1* | 8/2015 | Petschke | G06T 7/0012 382/131 |
| 2015/0257722 A1 | 9/2015 | Wang et al. | |
| 2015/0265227 A1* | 9/2015 | Sano | A61B 6/4233 378/64 |

* cited by examiner

*Primary Examiner* — Kiho Kim
(74) *Attorney, Agent, or Firm* — Oblon, McClelland, Maier & Neustadt, L.L.P.

(57) ABSTRACT

A method and apparatus is provided to detect and correct for distributed X-ray detection events in which the electrical signal arising from the detection of an X-ray is distributed across more than one element of an X-ray detection array. Examples of distributed-detection events include charge sharing across adjacent boundaries between detector elements and X-ray fluorescence between detector elements. Distributed-detection events can be determined by their corresponding to a partial-detection energy that is in a range of energies great than an upper energy for noise and crosstalk and less than a lower energy for an X-ray spectrum from an X-ray source. For a distributed-detection event, the energy of the event is recorded using a sum of electrical signals from the detector elements of the event.

20 Claims, 19 Drawing Sheets

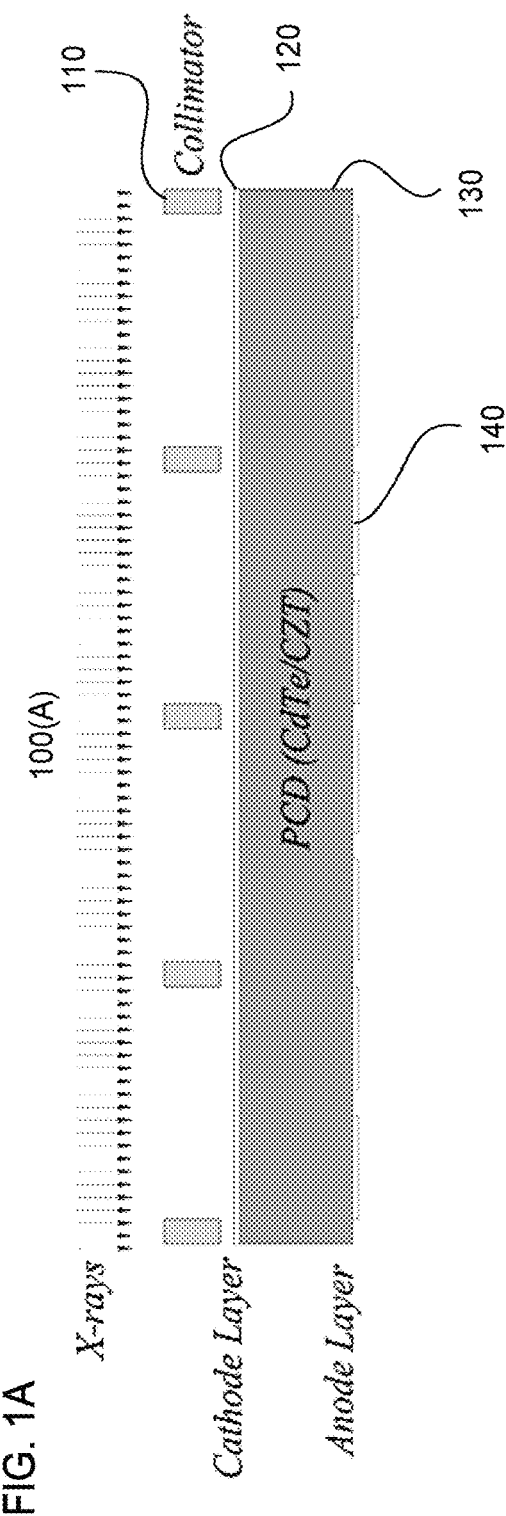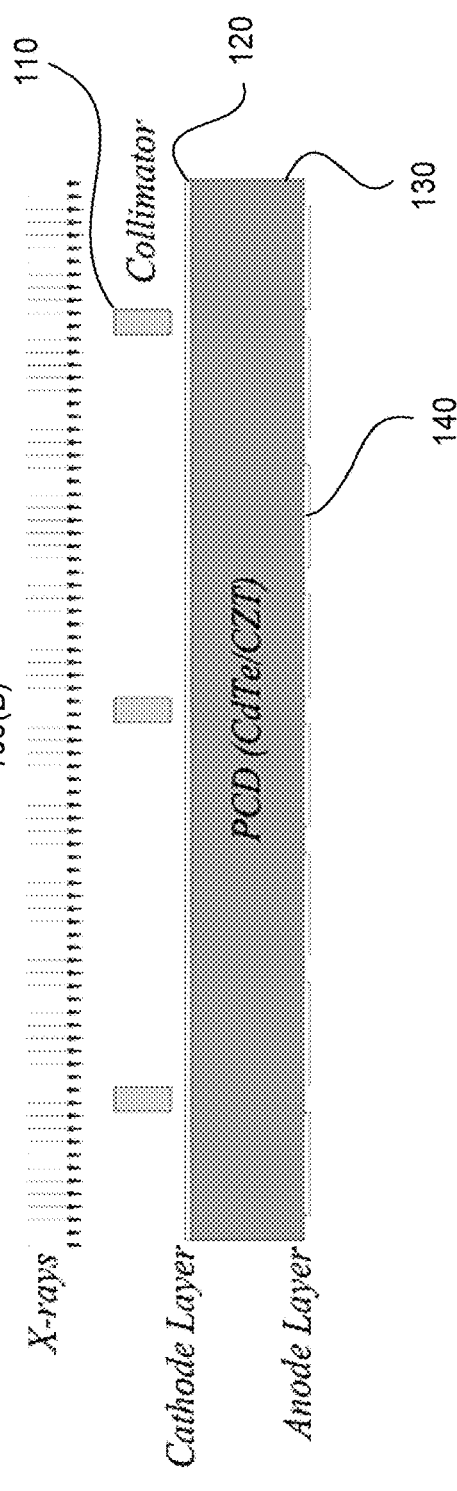
FIG. 1A
FIG. 1B

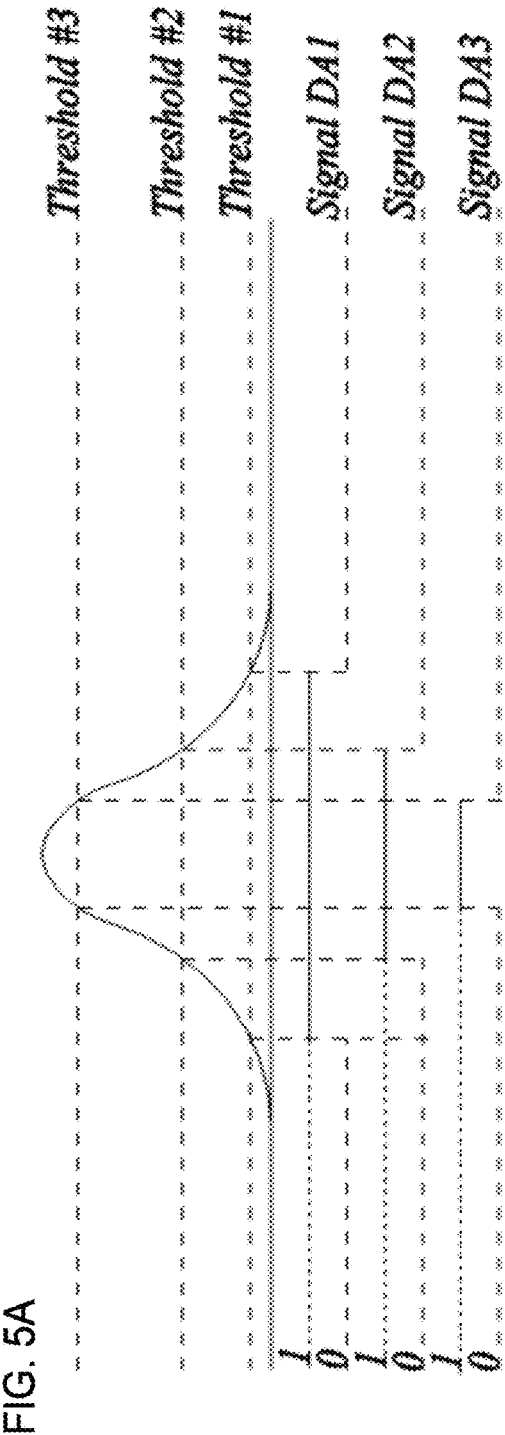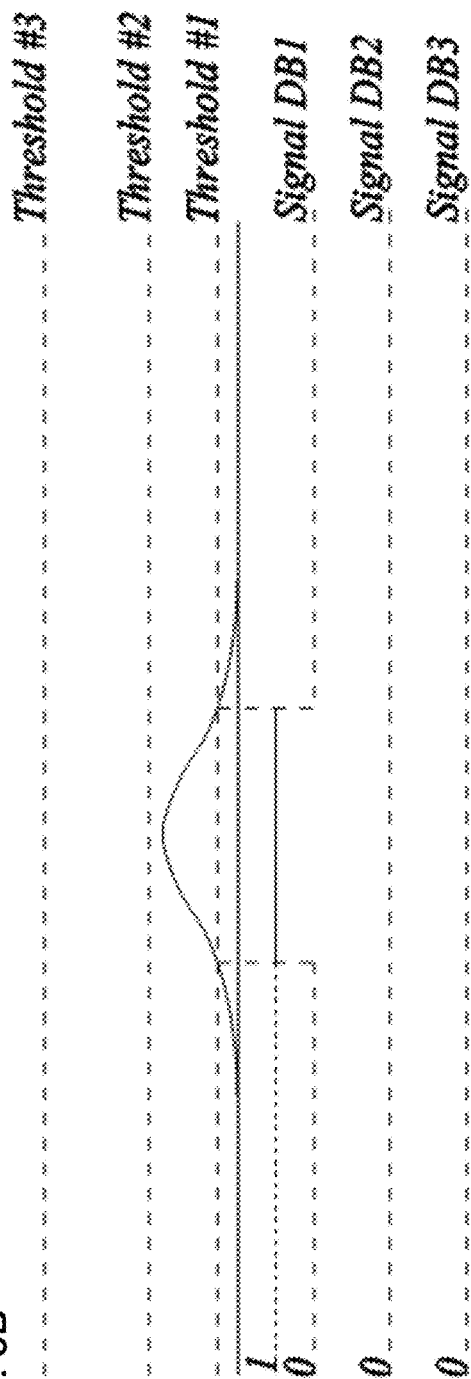
FIG. 5A
FIG. 5B

APPARATUS AND METHOD FOR A HIGH-FLUX PHOTON-COUNTING SPECTRAL APPLICATION-SPECIFIC INTEGRATED CIRCUIT (ASIC) HAVING A CHARGE SUMMING MODE

FIELD

This disclosure relates to an application-specific integrated circuit (ASIC) for counting photons (e.g., X-ray photons), and, more particularly, to using an ASIC configured for high-flux rates of X-rays and having a charge-summing mode capable of determining whether charge from a single X-ray detection event is distributed and detected across multiple detector elements, such as can occur due to fluorescence X-ray escape (i.e., K-escape) events and charge-sharing events.

BACKGROUND

X-ray detectors are used in many applications including computed tomography (CT). Additionally, X-ray detectors are used in various other projective measurements, such as radiographic and fluoroscopic imaging that lie outside the scope of CT imaging.

CT scanners generally create images of one or more sectional slices through a subject's body. A radiation source, such as an X-ray source, irradiates the body from one side. A collimator, generally adjacent to the X-ray source, limits the angular extent of the X-ray beam, so that radiation impinging on the body is substantially confined to a planar region (or a volume, for example, in cone-beam CT) defining a cross-sectional slice of the body. At least one detector (and generally many more than one detector) on the opposite side of the body receives radiation transmitted through the body substantially in the plane of the slice. The attenuation of the radiation that has passed through the body is measured by processing electrical signals received from the detector.

Historically, energy-integrating detectors have been used to measure CT projection data. More recently, photon-counting detectors (PCDs) have become a feasible alternative to conventional energy-integrating detectors. PCDs have many advantages including their capacity for performing spectral CT. To obtain the spectral nature of the transmitted X-ray data, the PCDs differentiate and record the incident X-ray photons using energy/spectrum bins, and count a number of photons in each energy/spectrum bin of each detector element.

Many clinical applications can benefit from spectral CT technology, which can provide improvement in material differentiation and beam-hardening correction. Further, semiconductor-based PCDs are a promising candidate for spectral CT, which is capable of providing better spectral information compared with conventional spectral CT technology (e.g., dual-source, kVp-switching, etc.).

Semiconductor-based PCDs used in spectral CT can detect incident photons and measure photon energy for every event. However, various complications arise due to phenomena such as pile-up, K-escape, and energy sharing. By accounting and correcting for these phenomena, improved projection data can be generated, resulting in higher image quality for CT image reconstruction.

Regarding fluorescence X-ray escape, when high energy photons impinge on a detector, the inner shell electrons from atoms of the detector are ejected from the atom as "photoelectrons." After the ionization or excitation, the atom is in an excited state with a vacancy (hole) in the inner electron shell. Outer shell electrons then fall into the created holes, thereby emitting photons with energy equal to the energy difference between the two states. Since each element has a unique set of energy levels, each element emits a pattern of fluorescence X-rays that are characteristic of the element, termed "characteristic X-rays" or "fluorescence X-rays." The intensity of the X-rays increases with the concentration of the corresponding element.

In many materials, such as Cadmium Telluride (CdTe) or Cadmium Zinc Telluride (CZT), the fluorescence X-rays primarily involve K-shell (closest shell to the nucleus of an atom) electrons. If the fluorescence X-rays escape from the detector, the detector signal is incorrect and the loss of energy incurred manifests itself as errors in the output spectrum of the detectors. Thus, the measured spectral signal can be distorted and may cause artifacts in the reconstructed image.

Regarding charge-sharing events, charge sharing occurs when charges from a detection event in one detector element or near the boundary between two adjacent detector elements results in the diffusion and migration from the point of detection to the electrodes of more than one electrode. Thus, a single detection event can result in electrical signals in more than one detector element, which can appear like two lower-energy detection events rather than a single higher-energy detection event.

Uncorrected, each of the above deviations from the ideal detector response can distort the detected spectrum relative to the incident spectrum, and can ultimately degrade the quality of reconstructed images and the material decomposition derived from the data.

BRIEF DESCRIPTION OF THE DRAWINGS

A more complete understanding of this disclosure is provided by reference to the following detailed description when considered in connection with the accompanying drawings, wherein:

FIG. 1A shows an array of detector elements arranged with collimators placed at a boundary of every second detector element, according to one implementation;

FIG. 1B shows an array of detector elements arranged with collimators placed at a boundary of every third detector element, according to one implementation;

FIG. 5A shows a plot of an implementation of comparator signals DA1, DA2, and DA3 for a channel A as a function of time;

FIG. 5B shows a plot of an implementation of comparator signals DB1, DB2, and DB3 for a channel B as a function of time;

DETAILED DESCRIPTION

Figure 1C:
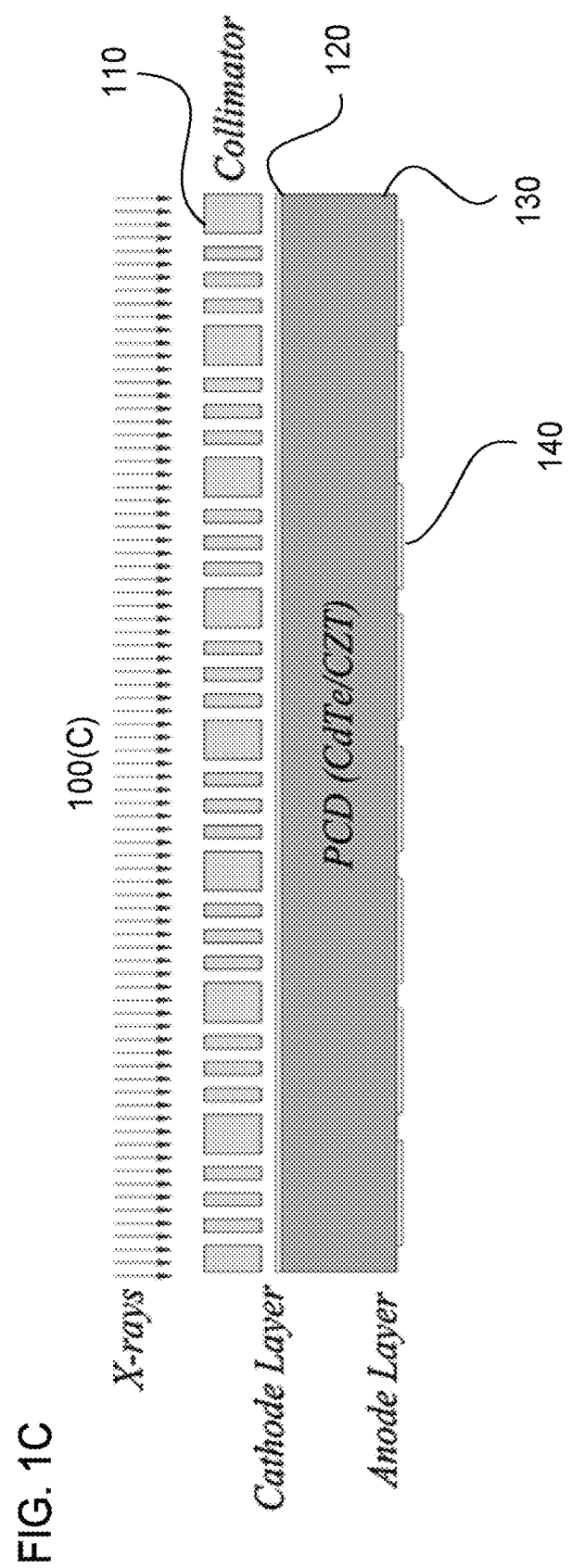
FIG. 1C shows an array of detector elements arranged with variously sized collimators arranged in front of a detection surface of a sensor material, according to one implementation.

To be effective, spectral CT scanners and fluoroscopes using photon-counting detectors (PCDs) use materials that are highly absorbing at X-ray wavelengths. Thus, the PCDs have sufficient stopping power to efficiently record the energy information incident on an X-ray sensor. Materials that are highly absorbing at X-ray wavelengths have higher atomic numbers (Z), e.g., CdTe and CZT, and, consequently, these materials can emit K-, L-, or M-X-rays when a photoelectric interaction occurs inside the sensor. The emitted K-, L-, or M-X-rays have a smaller energy than the original X-ray, and the attenuation coefficient of the sensor material at the emitted K-, L-, or M-X-rays can be less than the attenuation coefficient for the original X-ray. Further, the emitted X-rays can be emitted in random directions relative to the propagation direction of the original X-ray. Thus, the emitted X-rays can propagate through the sensor material over longer distances than the original X-rays, and the emitted X-rays can propagate between detector elements. Accordingly, an emitted photon from a first detector element can propagate into and be absorbed by a second detector element, resulting in what appears to be the detection of two smaller-energy X-rays in two separate but connect detector elements, rather than the detection of a single X-ray having an energy equal to the sum of the two detected energies. This process can generally be referred to as fluorescence X-ray escape or more simply K-escape.

Fluorescence X-ray escape has the disadvantageous effect of causing the recorded spectrum to shift towards lower energies relative to the actual incident spectrum because some of the energy of the original X-ray is reemitted as a fluorescence X-ray. Thus, rather than all of the absorbed X-ray energy being applied to creating photoelectrons, some of the energy (i.e., the characteristic energy corresponding to the difference between an empty inner electron K-, L-, or M-shell and an outer shell) is reemitted. The characteristic X-ray escape is often referred to as K-escape due to the fluorescence X-ray energy frequently corresponding to the K-edge.

In addition to the above-described K-escape scenario, charge sharing can occur near boundaries between detector elements even when no fluorescence X-rays are emitted. The energy of an originally detected X-ray will be much greater than the band gap of the semiconductor used as the sensor material, resulting in the absorbed X-ray energy generating a large number of photo-electrons. Due to various diffusion processes and charge effects, for example, the charge carriers generated by the absorption of the X-ray in the semiconductor will spread out as they migrate along electric potential lines towards the electrodes of the detector elements. As a result, photoelectrons generated near a boundary between a first and second detector element can be partially collected at the anode of the first detector element, with the remainder of the photoelectrons being collected at the anode of the second detector element. Thus, in this charge-sharing scenario, like the above-described K-escape scenario, the detection event appears to be the detection of two smaller energy X-rays by adjacent detector elements, rather than the detection of a single X-ray having an energy equal to the sum of the two detected energies.

The apparatuses and methods described herein advantageously mitigate the above-described challenges of a detection event of a single X-ray being recorded as two X-ray detections that collectively have the energy of the original X-ray. By mitigating the above-described challenges, the apparatus described herein can operate at higher flux rates at which detection events at adjacent detector elements become more common, increasing the challenges and importance of differentiating between adjacent detection events as opposed to distributed detection events.

In certain implementations, the apparatus uses a novel application-specific integrated circuit (ASIC) to combine the signals of adjacent detector elements, and selectively record, based on predefined criteria, the combined signal as the energy of a single detection event, rather than the individual signals from the adjacent detector.

In certain implementations, the apparatuses and methods described herein apply to CT scanners having stationary sparse PCDs used in spectral CT applications. The PCDs can have one-dimensional linear arrays of detector elements. Further, in certain implementations, the X-ray beam from an X-ray source can be collimated using a collimator that has an opening aligned to at least one anode of a detector element of the PCDs. The X-ray beam emitted from the X-ray source can be configured in either a fan-beam or a cone-beam geometry, for example.

In certain implementations, the apparatuses and methods described herein apply to CT scanners having energy-integrating detectors positioned across from the X-ray source, and the energy-integrating detectors can rotate synchronously with the X-ray source. The X-ray beam emitted from the X-ray source can be configured in either a fan-beam or a cone-beam geometry, for example.

Referring now to the drawings, wherein like reference numerals designate identical or corresponding parts throughout the several views, FIG. 1A shows a cross-section view of a detector 100(A) that includes a one-dimensional array of X-ray detector elements. X-rays are incident on a cathode layer 120 of the detector 110(A). The X-rays are then absorbed in a semiconductor layer 130. The semiconductor layer 130 can be cadmium telluride (CdTe) or cadmium zinc telluride (CZT), for example. Photoelectrons generated by the absorption of an X-ray travel along the direction of the electric potential from the cathode 120 to the anodes 140 to register respective detection events. The collimators 110 limit the acceptance angle for X-rays incident on the cathode layer 120. Further, the collimators 110 act as a baffle to shield the semiconductor regions near the collimators 110 from the X-rays. The collimators 110 also can be used as an anti-scatter grid to advantageously limit detection of scattered X-rays incident on the detector 100(A) at angles outside of a predefined acceptance angle. FIG. 1A shows an arrangement in which a collimator 110 is placed between every other transition between detector elements. Thus, for detector 100(A), each detector element shares exactly one unmasked boundary with another detector element, and the other boundary between detector elements is masked by a collimator 110.

FIG. 1B shows a cross-section view of a detector 100(B) that includes a one-dimensional array of X-ray detector elements. Like detector 100(A), detector 100(B) shows collimators 110 masking boundaries between some of the detector elements. However, in detector 100(B), every third boundary is masked, rather than every second boundary being masked.

In FIG. 1C, a cross-section view is shown of a detector 100(C). In detector 100(C), the collimators 110 have different widths depending on whether a particular collimator is positioned in front of an anode 140 or in front of a boundary between anodes. In detector 100(C), each boundary between anodes is masked by a wider collimator 110.

Each of the X-ray detector implementations shown in FIGS. 1A-1C are susceptible to energy information distortions due to K-escape, charge sharing, and weighting-potential cross-talk.

Figure 2A:
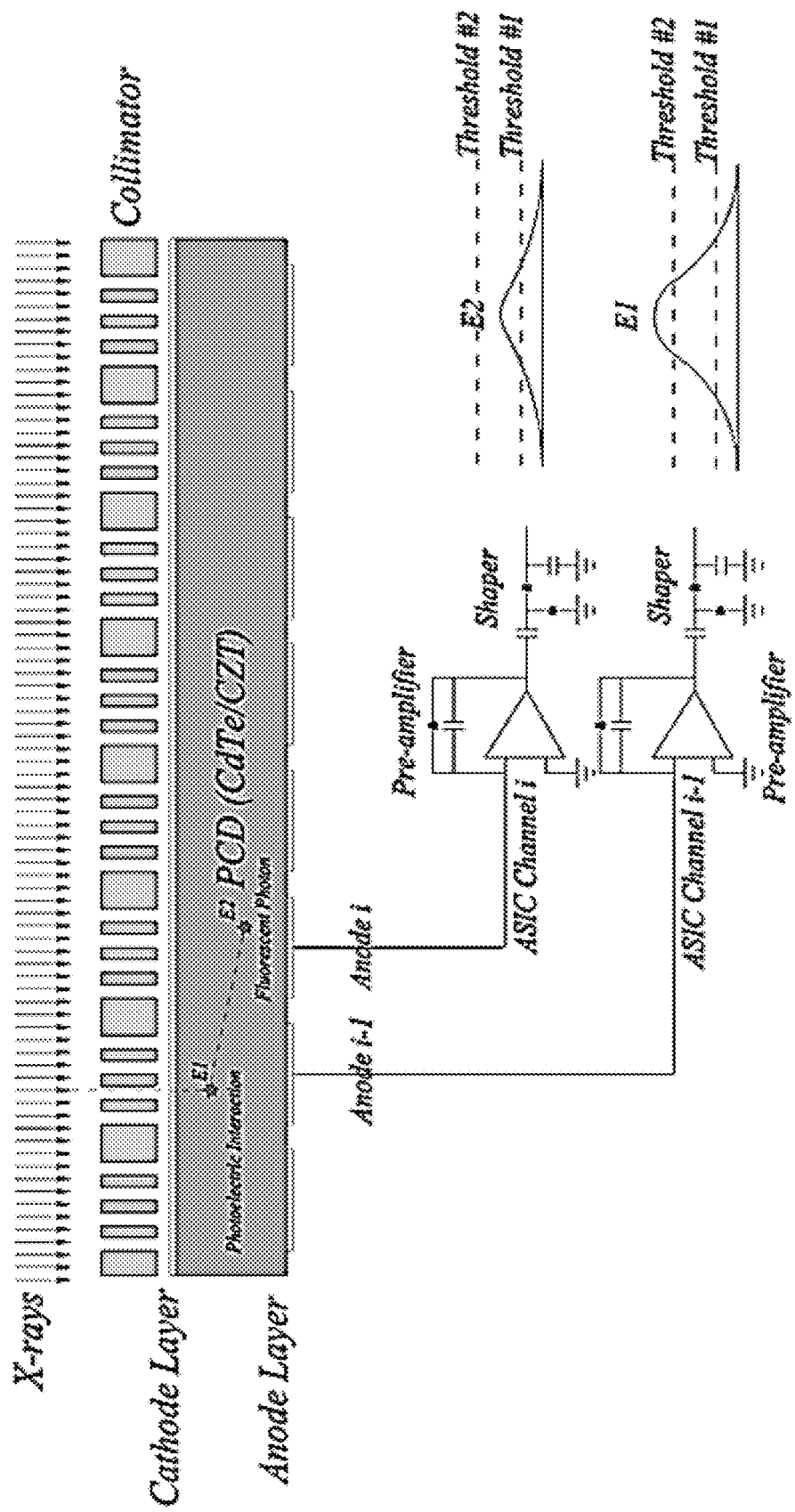
FIG. 2A shows a fluorescence X-ray event applied to an example of the detector array configuration of FIG. 1C, according to one implementation.
Figure 2B:
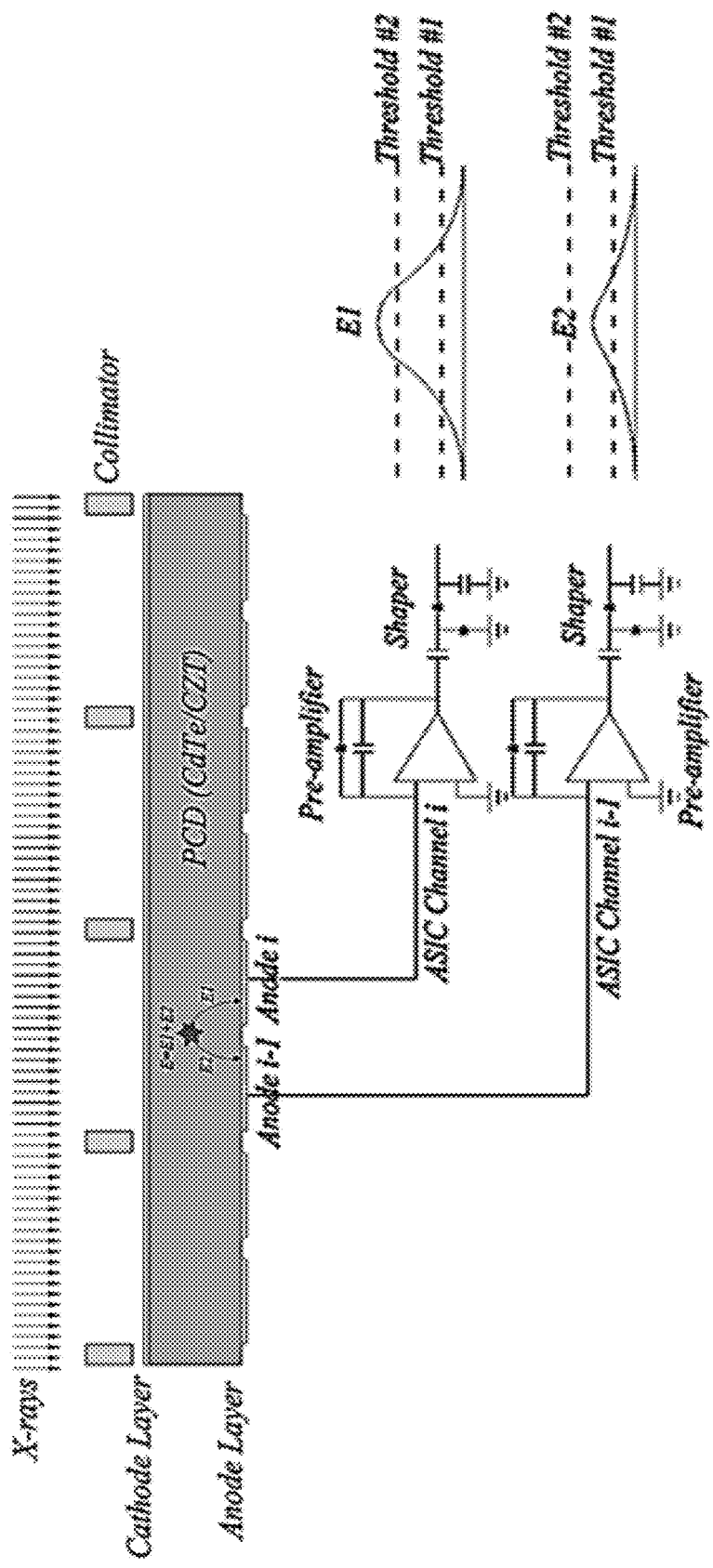
FIG. 2B shows a charge-sharing X-ray event applied to an example of the detector array configuration of FIG. 1A, according to one implementation.

FIGS. 2A and 2B respectively show examples of energy information distortions due to K-escape and charge sharing, when an apparatus does not use the ASIC concepts provided herein.

FIG. 2A shows an example of K-escape in which an X-ray having energy E1+E2 is incident at anode i-1. However, due to a photoelectric interaction, a fluorescence X-ray photon is generated having energy E2. While the remaining energy E1 is absorbed above anode i-1, the emitted fluorescence photon with energy E2 is absorbed at anode i. Thus, after the electrical signals from anodes i-1 and i are amplified and shaped by respective preamplifiers and pulse shapers, the signals are compared to predetermined thresholds, and the detection event is recorded as an X-ray detection, at anode i-i, having an energy greater than a second threshold, and a simultaneous X-ray detection, at anode i, having an energy between a first threshold and the second threshold.

FIG. 2B shows an example of charge sharing in which an X-ray having energy E1+E2 is incident at a boundary between anode i-1 and anode i. Part of the charge corresponding to an energy E2 is detected at anode i-1, while the remainder of the charge corresponding to an energy E1 is detected at anode i. The detection event is recorded as an X-ray detection having an energy between a first and second threshold at anode i-1 and a simultaneous X-ray detection having an energy greater than the second threshold at anode i.

Figure 3:
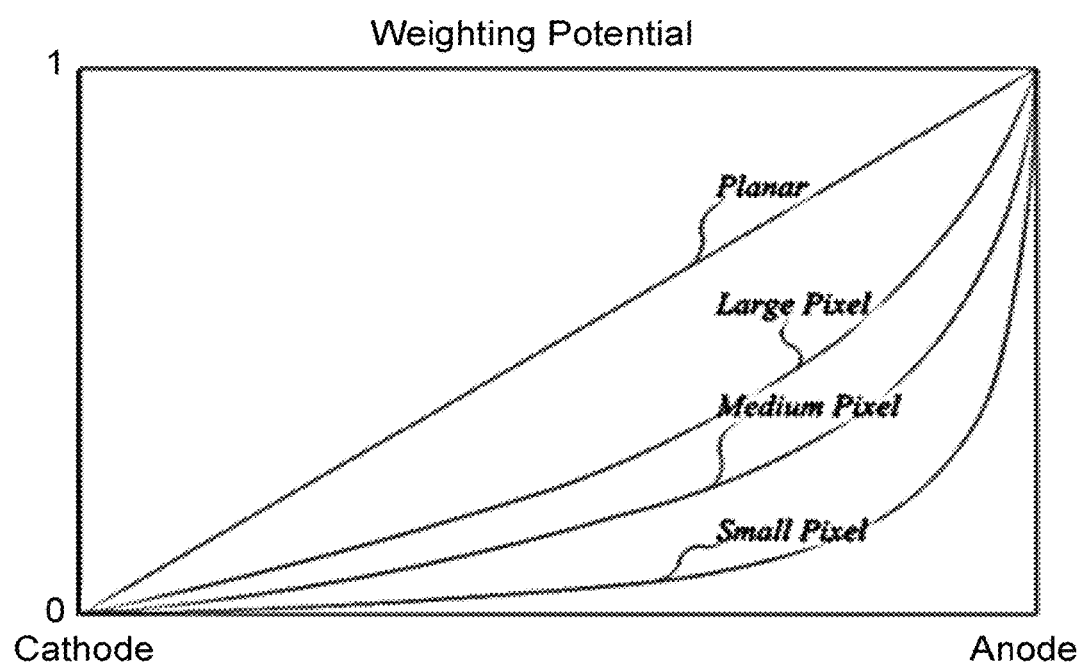
FIG. 3 shows an example of weighting potentials for various pixel (e.g., anode) sizes as a function of proximity to the anode.

FIG. 3 show a plot of weighting potentials for various pixel sizes in accordance with the Shockley-Ramo theorem. As would be understood by one of ordinary skill in the art, for CdTe and CZT based X-ray detectors, electrical signals generated primarily using electrons as the charge carriers generally have more desirable characteristics due to the much larger charge-carrier mobility of electrons relative to holes in CdTe and CZT. Accordingly, a weighting potential that rapidly decreases away from the anode is preferable due to its ability to selectively register the presence of electrons migrating to the anode while remaining largely unaffected by the slow moving holes far from the anode. For this reason, smaller anodes (pixels) have desirable qualities for PCDs. However, smaller anodes also exacerbate the effect of charge sharing by increasing the likelihood that a detection event will be distributed across multiple detector elements. Thus, a tradeoff exists between making anodes smaller to achieve certain desirable effects, while avoiding other undesirable effects of smaller anodes. The ASICs, apparatuses, and methods described herein help resolve this tradeoff by overcoming ambiguities arising from the detection of an X-ray being distributed across multiple detector elements.

Without the ASICs, apparatuses, and methods described herein, the count rate in existing spectral CT systems is limited by the PCD sensor physics and ASIC parameters, such as the shaping time, gain, and band-width/rise-time of the pileup rejection circuit. Existing ASIC channels connected to PCD anode pixels have limited counting capability due to pileup effects, especially at higher fluxes, whereby the pileup can degrade the detector response. Further, PCDs using existing ASIC channels tend to suffer from baseline shifting at higher fluxes due to tail pileup effects, which can also degrade detector response.

Figure 4A:
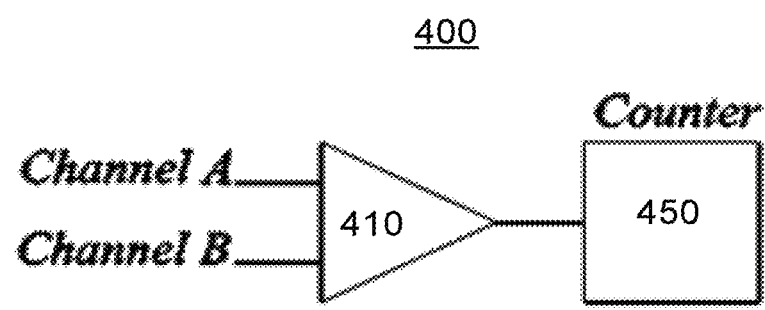
FIG. 4A shows a high-level circuit diagram of an ASIC for differentiating a distributed detection of a single X-ray across two detector elements, according to one implementation.
Figure 4B:
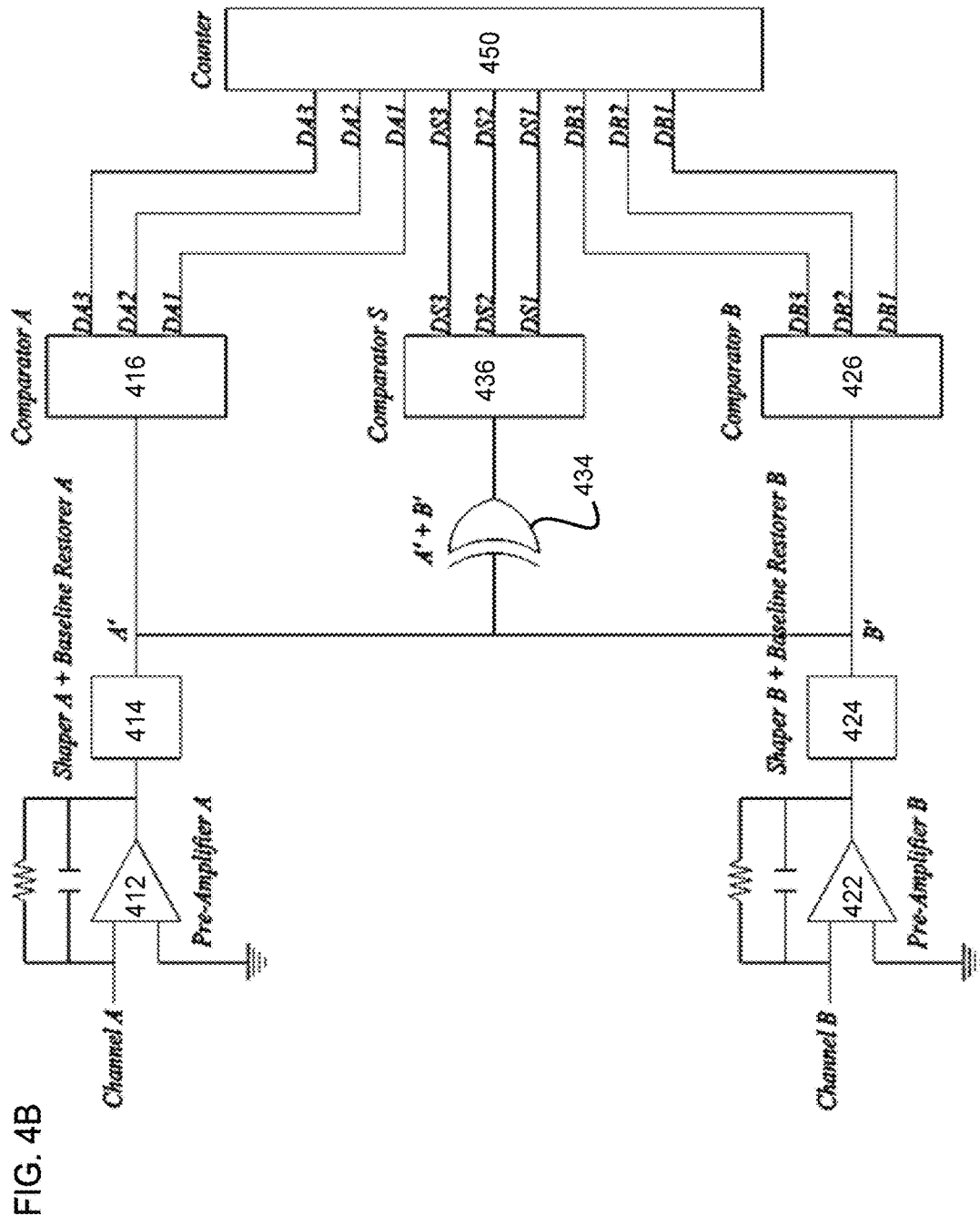
FIG. 4B shows a low-level circuit diagram of an ASIC for differentiating a distributed detection of a single X-ray across two detector elements, according to one implementation.

FIGS. 4A and 4B show schematic diagrams of a distributed-detection resolving ASIC 400. The ASIC 400 includes a channel A and a channel B. The channels A and B are inputs into a signal preconditioning and thresholding circuit 410. The output of circuit 410 is then provided as an input to the counter 450 that performs the logical determination of how a detection event within a detection window is recorded. For example, the detection event can be recorded as: (i) no detection event in either channel A or channel B, (ii) a detection in channel A only, (iii) a detection event in channel B only, (iv) two separate detection events respectively occurring in channel A and in channel B, or (v) a distributed detection event for a single event that is detected at both channel A and channel B. Additionally, the ASIC 400 can include pile-up rejection circuitry in which multiple detection events occurring in a channel within a given detection window would be flagged for exclusion from the projection data.

As shown in FIG. 4B, channel A can be preamplified using preamplifier 412. Next, a beam shaper 414 modifies the pulse coming out of the preamplifier 412 according to a predefined impulse response function to shape the pulse and restore the pulse baseline. Thus, the input pulse A is converted to a pulse with shape A'. Next, a comparator 416 is used to resolve the energy of the pulse into one of several discrete energy bins.

FIG. 5A shows a plot of pulse A' being compared to three energy thresholds by the comparator 416. When pulse A' exceeds threshold 1, signal DA1 has a digital value of "1." Otherwise, DA1 has a digital value of "0." When pulse A' exceeds threshold 2, DA2 has a digital value of "1." Otherwise, DA2 has a digital value of "0." When pulse A' exceeds threshold 3, DA3 has a digital value of "1." Otherwise, DA3 has a digital value of "0."

Similarly, channel B can be preamplified using preamplifier 422. Next, a beam shaper 424 modifies the pulse coming out of the preamplifier 422 according to a predefined impulse response function to shape the pulse and restore the pulse baseline. Thus, the input pulse B is converted to a pulse with shape B'. Next, a comparator 426 is used to resolve the pulse into one of several discrete energy bins corresponding to signals DB1, DB2, and DB3. As shown in FIG. 5B, the signals DB1, DB2, and DB3 are generated analogously to signals DA1, DA2, and DA3 for channel A.

Figure 5C:
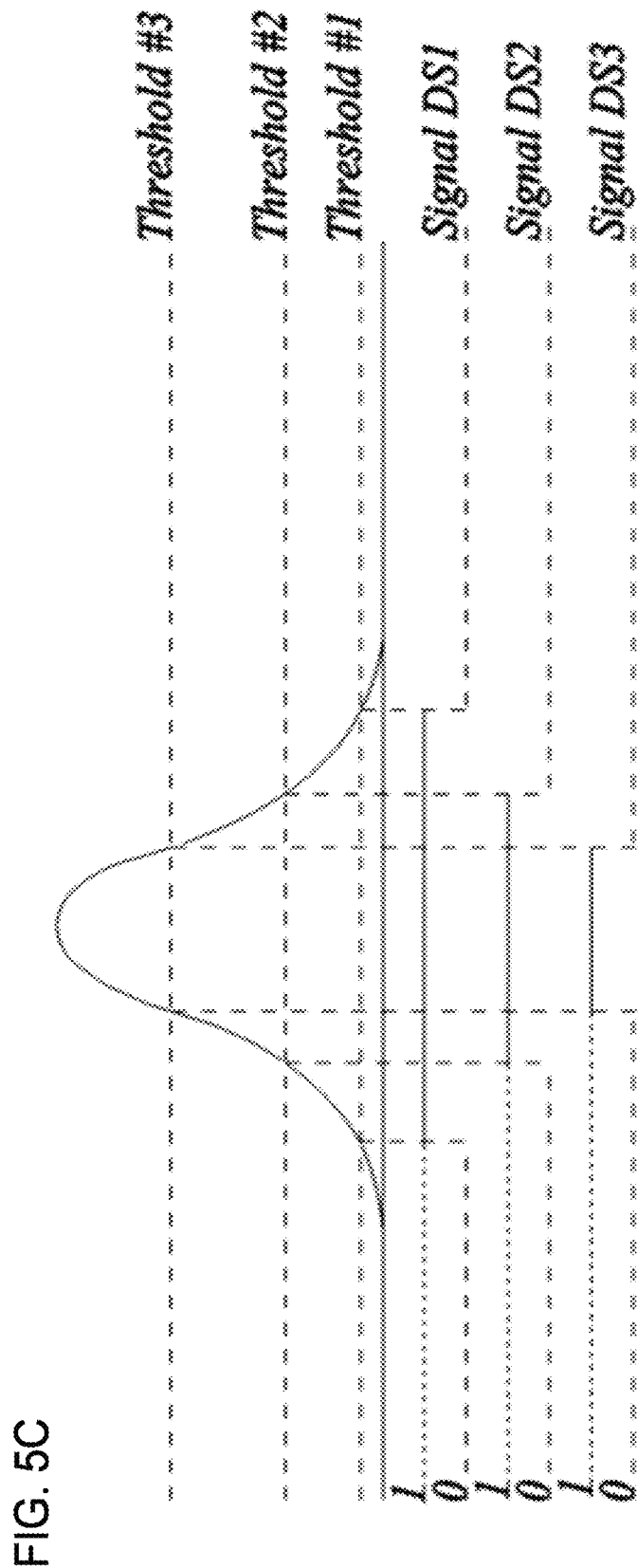
FIG. 5C shows a plot of an implementation of comparator signals DS1, DS2, and DS3 as a function of time for a summation of the signals from channels A and B.

In FIG. 4C, the signal S, which is the sum of the signals A' and B', is generated by the analog summing circuit 434. Next, the comparator 436 compares the resultant signal S to the same three thresholds used in channels A and B. Based on this comparison, the comparator 436 generates the signals DS1, DS2, and DS3. FIG. 5C shows an example of a conversion from the pulse S to signals DS1, DS2, and DS3.

The circuit 410 includes the preamplifiers 412 and 422, the pulse shapers 414 and 424, the summing circuit 434, and the comparators 416, 426, and 436.

In certain implementations, the ASIC configuration shown in FIGS. 4A and 4B can be used with the collimator configuration shown in FIG. 1A, in which case there is a collimator masking every second boundary between adjacent anodes of the detector elements. Additionally, the ASIC configuration shown in FIGS. 4A and 4B can be used when a slotted collimator or an anti-scatter grid is used to limit the acceptance angle for X-rays incident on the PCD sensor, as shown in FIG. 1C.

Based on digital signals sent from the comparators 416, 426, and 436 to the counter 450, the correct number of X-rays is counted/recorded together with the corresponding correct energies. In certain implementations, if both channel A and channel B indicate a detection event within the same detection time-window, then the detection event is recorded as a single distributed detection event and the energy of the detection event is recorded using channel S. If only one of channel A and channel B registers a detection event, then the detection event is attributed to the respective channel with the corresponding energy indicated for that channel.

In certain implementations, chance coincidence events can be minimized by applying a larger bandwidth/faster pulse shaper to the respective channels in order to enable a shorter time-window in which to perform measurements. Additionally, chance coincidence events can be minimized by limiting the flux incident on the PCDs.

Figure 6:
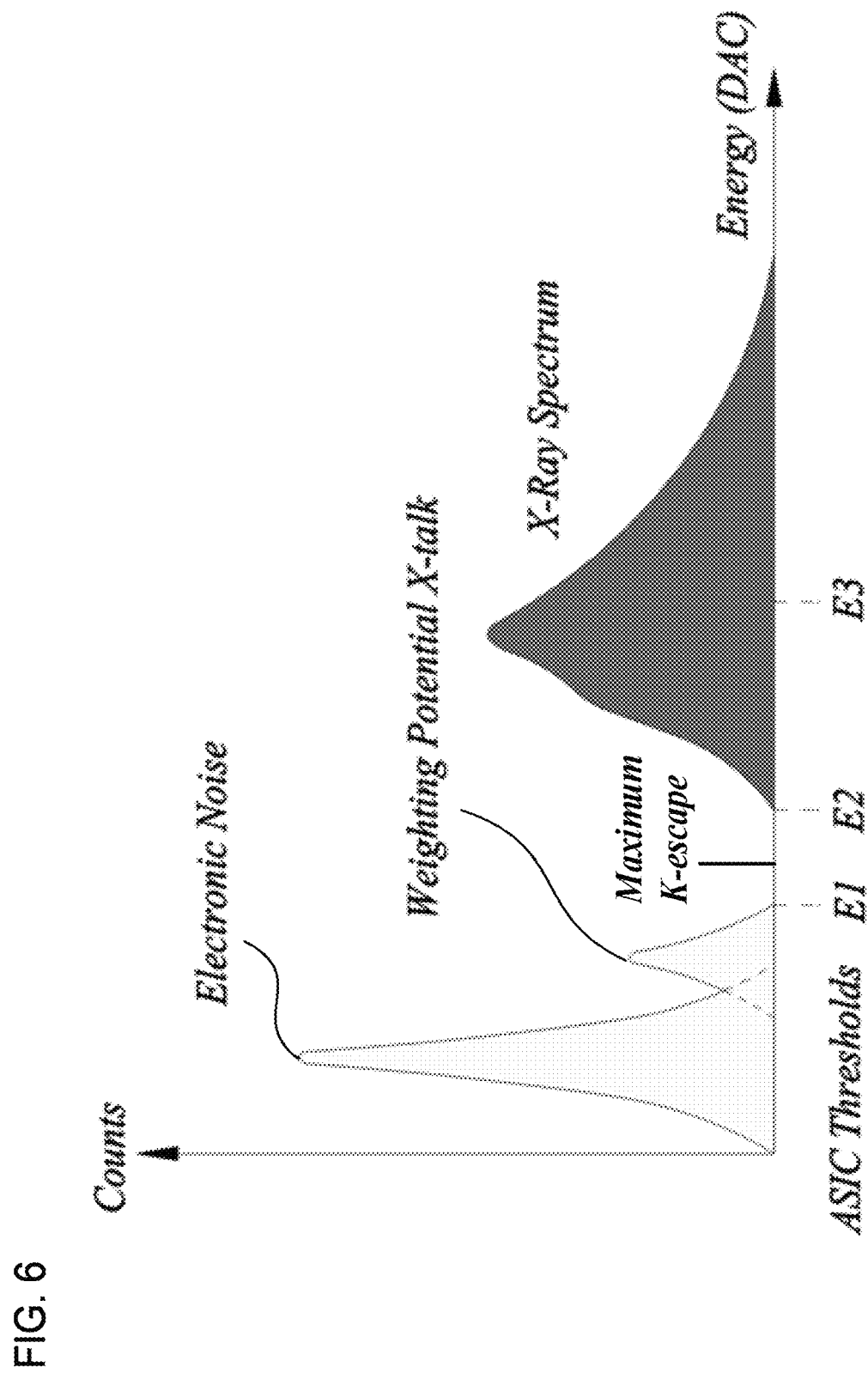
FIG. 6 shows a plot of energy spectra of the electrical noise cross-talk noise, and X-ray signal represented as counts as a function of energy, and shows are the relative positions of the energy thresholds of the comparators, according to one implementation.

FIG. 6 shows a plot of the various energy spectra (e.g., the X-ray energy spectrum and the noise spectrum) contributing to the signal on the detector elements on the PCDs. The spectra are plotted as the number of counts versus energy. The light-grey regions represent counts due to noise and the dark-grey region represents count contributions arising from the incident X-rays. The lowest energy light-grey peak represents electronic noise attributable to thermal noise (e.g., dark current). The higher energy light-grey peak is also electronic noise, but this peak represents the weighting-potential cross-talk (X-talk) between neighboring detector elements. The weighting-potential X-talk is dependent on the size of the respective detector elements (e.g., anodes).

FIG. 6 also shows the relation of the thresholds relative to the noise and X-ray spectra. In certain implementations, threshold 1 (i.e., energy E1) is arranged to be greater than the maximum expected energy of the electronic and the noise signals due to weighting-potential X-talk from a neighboring detector element. Threshold 2 (i.e., energy E2) is arranged above the maximum expected energy of fluorescent X-rays. The exact energy of fluorescence X-rays will depend on the semi-conductor constituting the sensor material, and the energy of the upper end of the X-ray spectrum of the X-ray source. Additionally, threshold 2 is preferentially arranged below the minimum energy of the X-ray spectrum of the X-ray source. Threshold 3 (i.e., energy E3) can be chosen to be any value greater than threshold 2, and can be set based on imaging requirements (e.g., threshold 3 can be selected according to desired attributes for material decomposition). In certain implementations, any number of additional energy thresholds can be set to energies greater than threshold 2.

Based on thresholds set according to the above-identified criteria, the counter 450 can apply logic based on the principles that (i) signals greater than E1 are not attributable entirely to noise, (ii) signals less than E2 do not represent all of the energy from an X-ray from the X-ray source, which has a spectrum above E2, and (iii) signals greater than E2 are not attributable entirely to K-escape. Accordingly, a detection event greater than E1 and less than E2 indicates either a charge-sharing event or a K-escape event, which are collectively referred to as distributed-detection events. When a distributed-detection event is determined, a sum pulse S, rather than individual signals of channels A and B, are used to represents the energy of the detection event.

In certain implementations, a detection event can include signals registered in both channels A and B, wherein the first channel registers a magnitude greater than E1 but less than E2, and the second channel registers a signal greater than E2. In this case, the summed amplitude is attributed entirely to the second channel, which has a signal greater than E2. In contrast, in certain other detection events, both channels A and B will both register magnitudes greater than E1 but less than E2. In this case, objective criteria is absent for assigning the detection event to one or the other channel. Thus, the detection event is assigned to one of the channels using an arbitrary tie breaker. Accordingly, the counter 450 can include logic to break an apparent tie between channels registering equal magnitudes, thereby to assign the distributed detection event to only one of the two respective channels. For example, the tie-breaking logic could be based on a random number or a predefined flag value that toggles between the two channels.

Additionally, in certain implementations accounting for K-escape and/or charge sharing in which collimators are spaced more than two detector elements apart, the ASIC 400 can include a channel C, which is similar to channels A and B. Further, a second sum signal $S_{B+C}$ can represent a summation of pulses B' and C', assuming anodes B and C are adjacent to each other. Similarly, the original summation signal between channels A and B can be designated as $S_{A+B}$. When channel B registers a signal having an energy between E1 and E2, then the counter 450 can include logic to determine whether the X-ray detection event is recorded using the pulse $S_{A+B}$ or $S_{R+C}$. When channel C registers a signal having an energy between E1 and E2, then the counter 450 can include logic to determine whether the X-ray detection event is recorded using the pulse $S_{B+C}$. When channel A registers a signal having an energy between E1 and E2, then the counter 450 can include logic to determine whether the X-ray detection event is recorded using the pulse $S_{A+B}$, as discussed above in reference to FIG. 4B.

This embodiment is not limited to only pairs or triplets of detector elements. As would be understood to one of ordinary skill in the art, using summation pulse signals and corresponding comparators to account for the true pulse energy of a distributed detection event for detector elements having neighboring edges can be extended to each pair of detector elements that are anticipated as being susceptible to charge sharing and/or K-escape.

In certain implementations, to account for charge sharing, the threshold 2 can be selected to be half the charge sharing contribution from a high-energy X-ray of the energy spectrum of the X-ray source. For example, the high-energy X-ray can be the upper boundary of the energy spectrum of the X-ray source. Alternatively, the high-energy X-ray can be determined as an energy at which less than a predefined ratio (e.g., 5% or 10%) of the incident X-ray count/energy is above the energy of the high-energy X-ray.

In certain implementations, the choice of thresholds is selected primarily with a view to mitigate K-escape ambiguities. In certain implementations, the choice of thresholds is selected primarily with a view to mitigate energy-sharing ambiguities. In certain implementations, the choice of thresholds is directed to mitigate both energy-sharing and K-escape ambiguities.

In certain implementations, the ASIC 400 is configured to mitigate ambiguities between two adjacent detector elements.

In certain implementations, the ASIC 400 is configured to mitigate ambiguities between three detector elements, the first detector element being adjacent to a second detector element and the second detector element being adjacent to a third detector element, but the third detector element not being adjacent to the first detector element. That is to say, in this implementation, the ASIC 400 accounts for charging sharing or K-escape between the first and second detector elements and between the second and third detector elements, but not between the first and third detector elements.

In certain implementations, the ASIC 400 is configured to mitigate ambiguities between every pair of detector elements having adjacent edges with each other.

In certain implementations, the ASIC 400 is configured to mitigate ambiguities between every pair of detector elements having adjacent edges to each other, except for the adjacent edges that are masked by a collimator or other masking structures capable of limiting the number of X-ray incident on the region of the respective adjacent edges.

The ASIC 400 mitigates ambiguities between pairs of detector elements by summing the pulses from the respective detector elements, comparing the respective pulses and the sum of the pulses to thresholds, similar to comparisons exemplified in FIGS. 5A, 5B, and 5C. The counter 450 of 400 then performs a logical comparison to determine which of the pulses (e.g., the pulses from the individual channels or the sums between the individual channels) more likely represents the energy of the detected X-ray, and records the comparator signals that are determined to more likely represents the energy of the detected X-ray.

In certain implementations, ASIC 400 can have a pileup-rejection capability and record no event if detection results indicate that multiple detection events occurred at a single detector element or pair of adjacent detector elements within the same detection window.

Figure 7A:
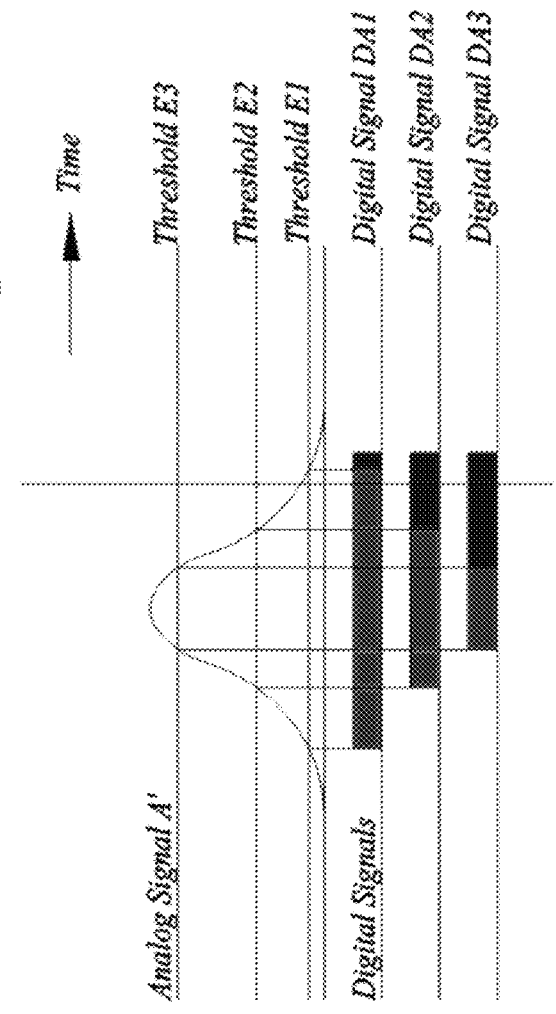
FIG. 7A shows a plot of an implementation of comparator signals DA1, DA2, and DA3 for the channel A using a sample-and-hold or a latching circuit with a reset.
Figure 7B:
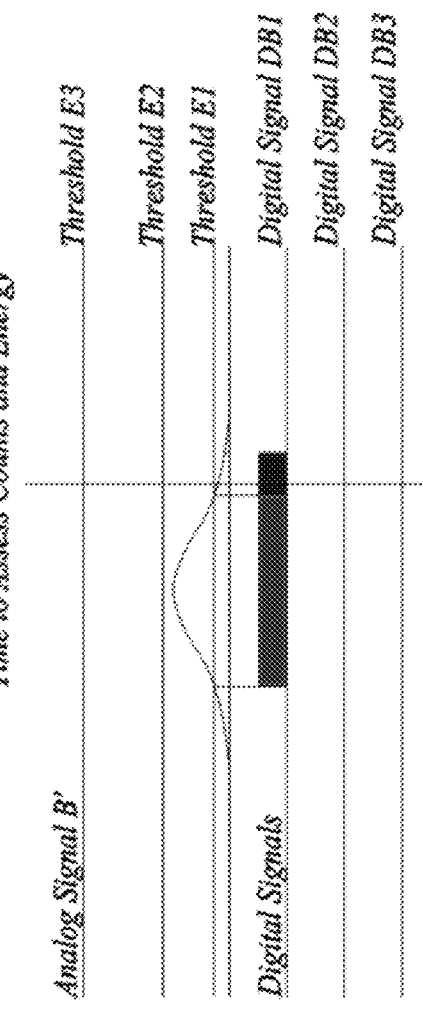
FIG. 7B shows a plot of an implementation of comparator signals DB1, DB2, and DB3 for the channel B using a sample-and-hold or a latching circuit with a reset.
Figure 7C:
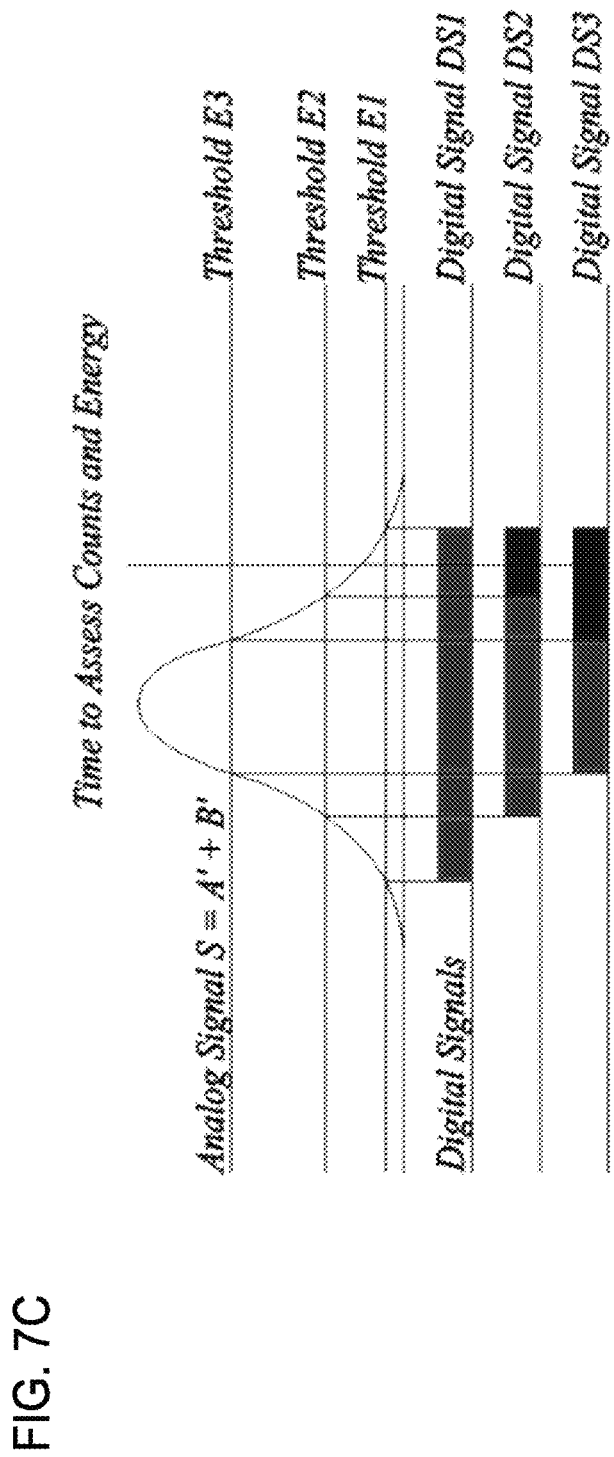
FIG. 7C shows a plot of an implementation of comparator signals DS1, DS2, and DS3 for the summation of the signals from channels A and B using a sample-and-hold or a latching circuit with a reset.

FIGS. 7A, 7B, and 7C show that, in certain implementations, a latching circuit can be added to the ASIC 400, either incorporated in the comparators 416, 426, and 436 or concatenated after the respective comparators 416, 426, and 436, such that after the digital threshold signals switch to their high state, the threshold signals remain high until a predefined reset time, at which time all of the threshold signals are reset to their respective low values (i.e., a digital "0" value). As shown in FIGS. 7A, 7B, and 7C, the reset time occurs after the time to assess and record the counts and the energy corresponding to the detection events.

Figure 8A:
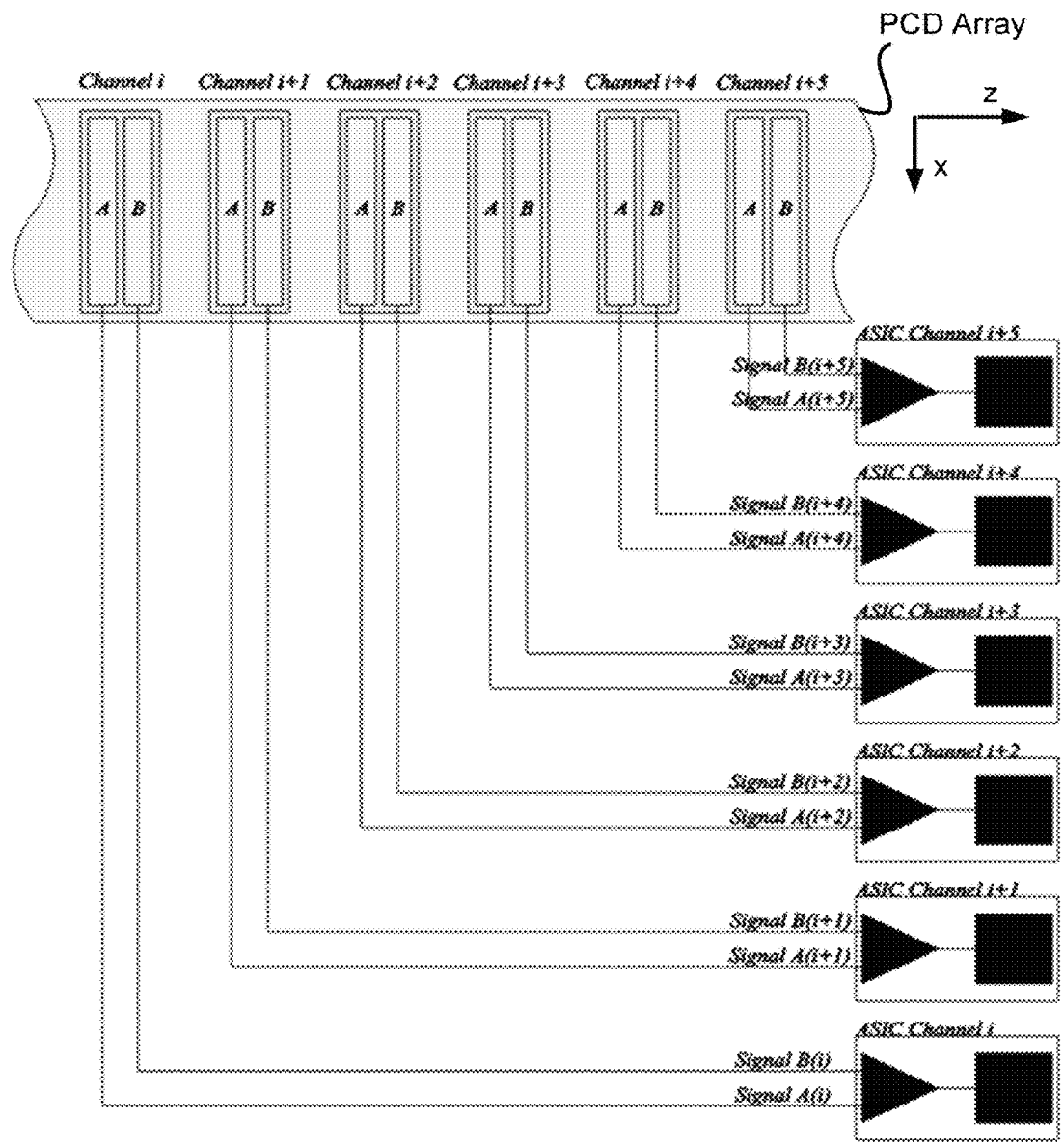
FIG. 8A shows a configuration of one implementation of pairs of detector elements arranged side-by-side in the longitudinal direction (i.e., z-direction), each pair of detector elements directing X-ray detection signals to a respective ASIC that, among other things, resolves and records distributed detection signals.

FIG. 8A shows an example in which a one-dimensional array of PCDs is grouped pairwise to mitigate charge-sharing and/or K-escape ambiguities between each channel pair. For example, channel pair i includes a PCD A and a PCD B with their respective detection signals being routed as signal A(i) and signal B(i) to an ASIC 400 for channel i (labeled ASIC channel i). Channels i+1, i+2, . . . , i+5 are similar to channel i. Each of the ASICs 400 for the respective channels disambiguates charge-sharing and/or K-escape ambiguities arising between each respective pair but do not account for charge-sharing and/or K-escape among the respective channels i, i+1, i+2, . . . , i+5. This configuration can be used, for example, for a PCD array having X-ray masking (e.g., collimators) or larger separations between every other detector element, such as the PCD array shown in FIG. 1A. In FIG. 8A, the edges of the detector elements that are adjacent to the other detector element run along a transverse direction (i.e., x-direction) that is transverse to the longitudinal z-direction. The adjacent edges are separated in the longitudinal direction. The longitudinal direction (i.e., the z-direction), runs along the long axis of the PCD array in which the groupings of detector elements (e.g., pairs in FIGS. 8A and 8C, and triplets in FIGS. 8B and 8D) are arranged.

Figure 8B:
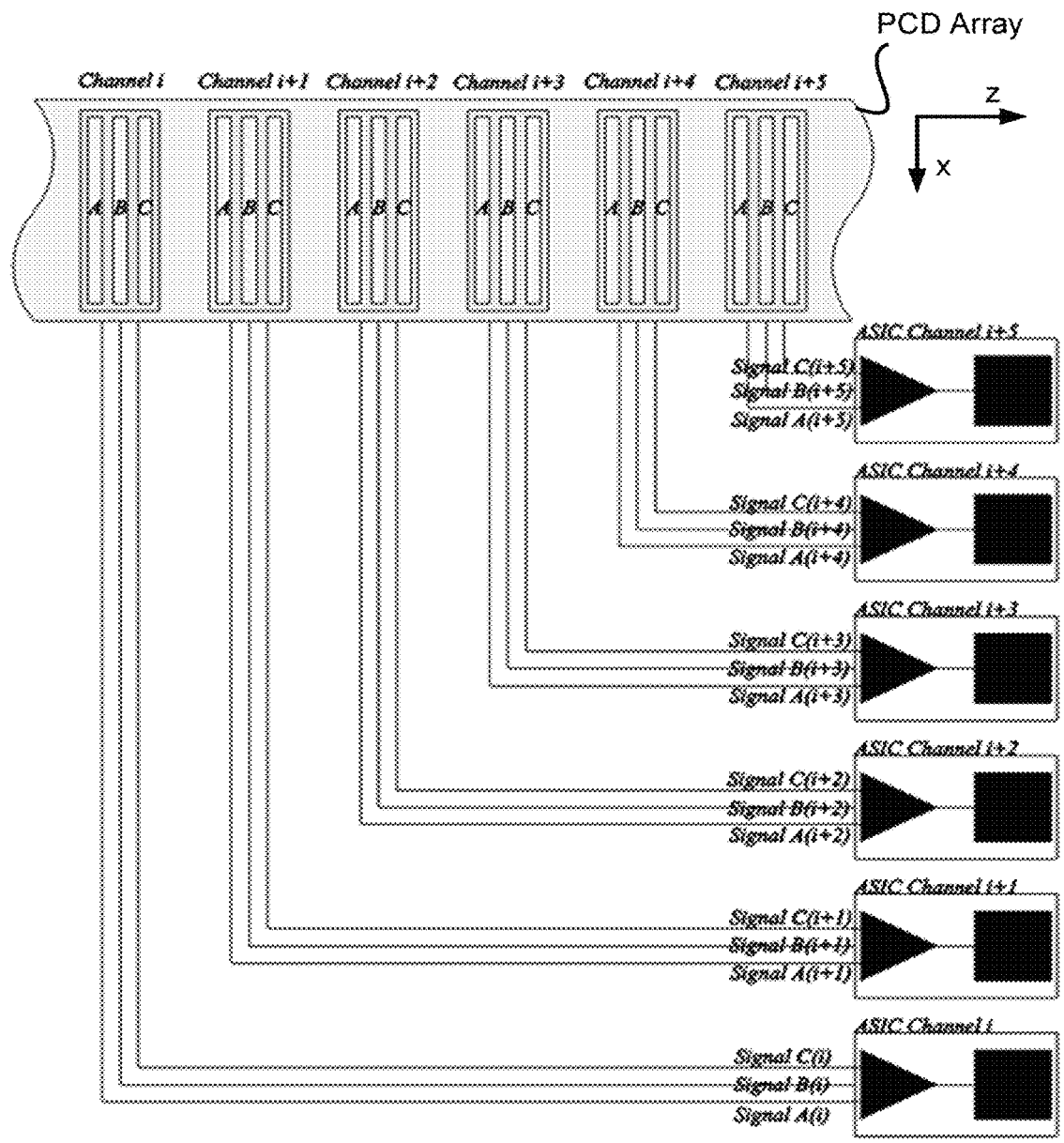
FIG. 8B shows a configuration of one implementation of triplets of detector elements arranged side-by-side in the longitudinal direction (i.e., z-direction), each triplet of detector elements directing X-ray detection signals to a respective ASIC that resolves and records distributed detection signals.

In FIG. 8B, groupings of three detector elements (triplets) are shown, wherein each triplet is processed by a respective ASIC 400. For example, there can be a collimator or other masking material arranged at the boundary edge between each grouping of three detector elements, as shown in FIG. 1B. In FIG. 8B, the ASICs 400 account for charge-sharing and/or K-escape between PCDs A and B and for charge-sharing and/or K-escape between PCDs B and C, as discussed above. Again the adjacent edges of the detector elements run along the transverse direction (i.e., the x-direction) and the detector elements in each triplet are arranged in the longitudinal direction (i.e., the z-direction).

Figure 8C:
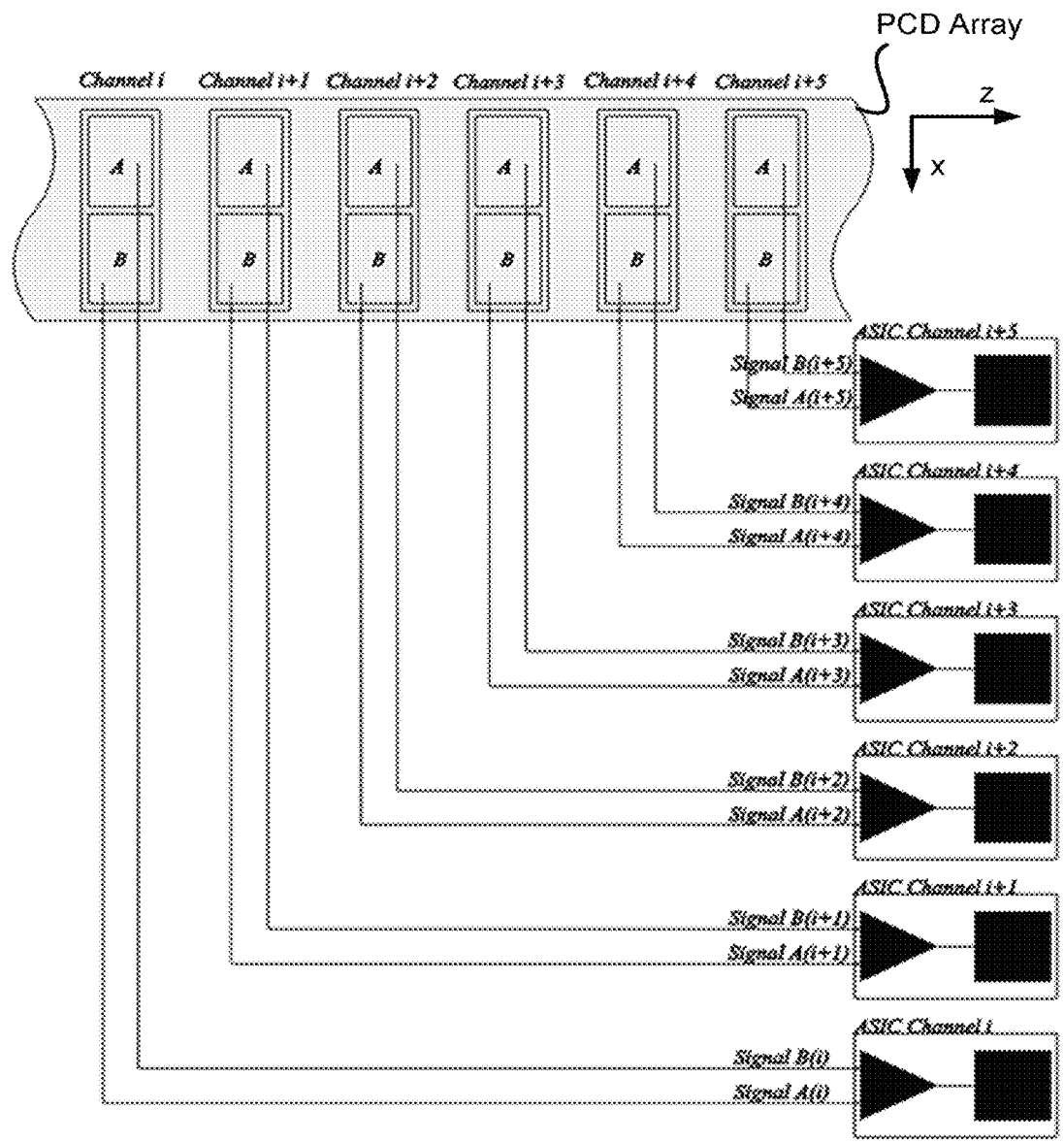
FIG. 8C shows a configuration of one implementation of pairs of detector elements arranged side-by-side in a transverse direction (i.e., x-direction), each pair of detector elements directing X-ray detection signals to a respective ASIC that resolves and records distributed detection signals.

In FIG. 8C, groupings of two detector elements are shown being processed by respective ASICs 400. In FIG. 8C, the ASICs 400 account for charge-sharing and/or K-escape between PCDs A and B, as discussed above. The adjacent edges of the detector elements run along the longitudinal direction (i.e., the z-direction) and the detector elements of each pair are arranged in the transverse direction (i.e., the x-direction).

Figure 8D:
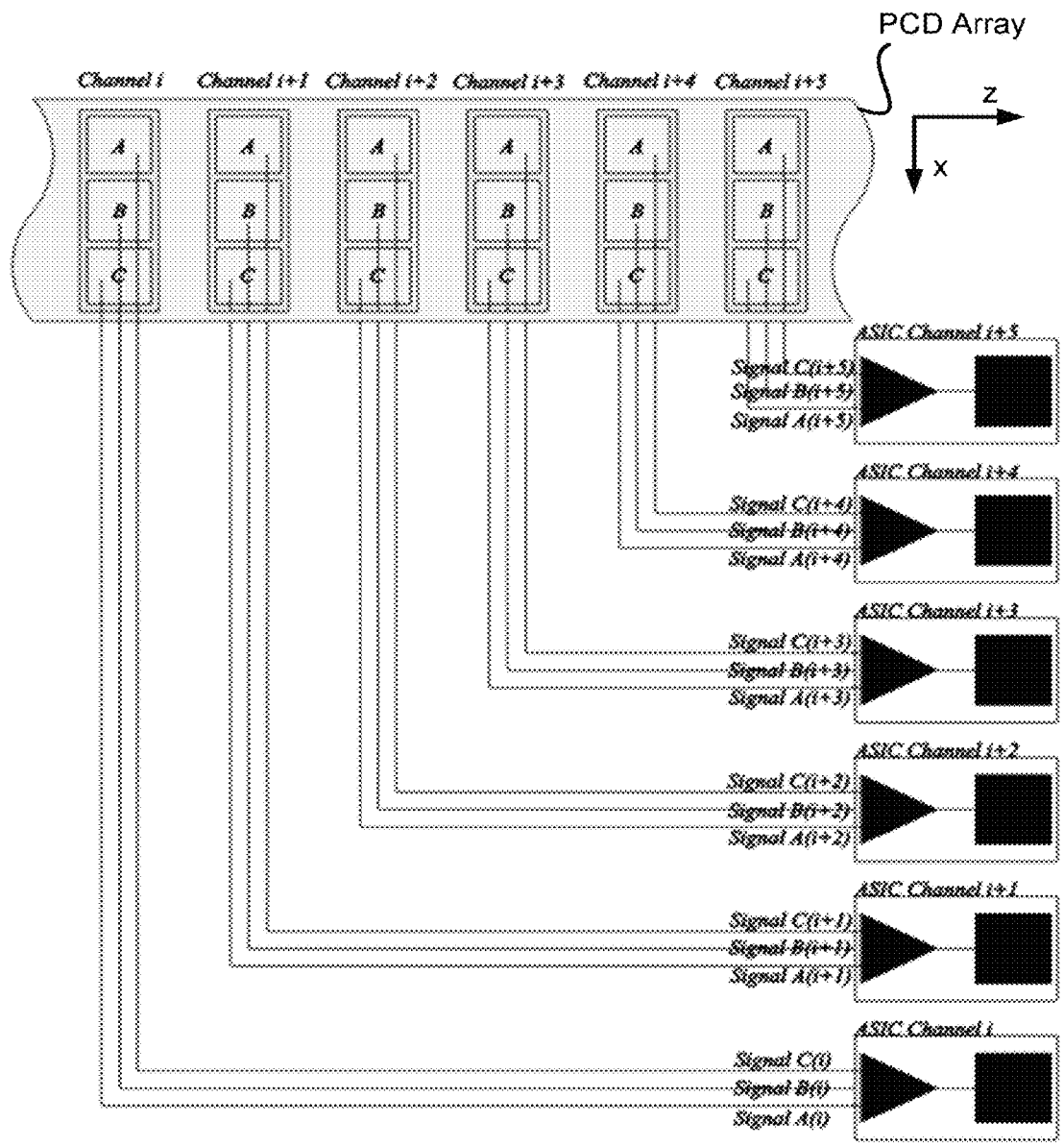
FIG. 8D shows a configuration of one implementation of triplets of detector elements arranged side-by-side in a transverse direction (i.e., x-direction), each triplet of detector elements directing X-ray detection signals to a respective ASIC that resolves and records distributed detection signals.

In FIG. 8D, groupings of three detector elements are shown being processed by respective ASICs 400. In FIG. 8D, the ASICs 400 account for charge-sharing and/or K-escape between PCDs A and B and for charge-sharing and/or K-escape between PCDs B and C, as discussed above. Again the adjacent edges of the detector elements run along the longitudinal direction (i.e., the z-direction) and the detector elements of each triplet are arranged in the transverse direction (i.e., the x-direction).

Figure 9:
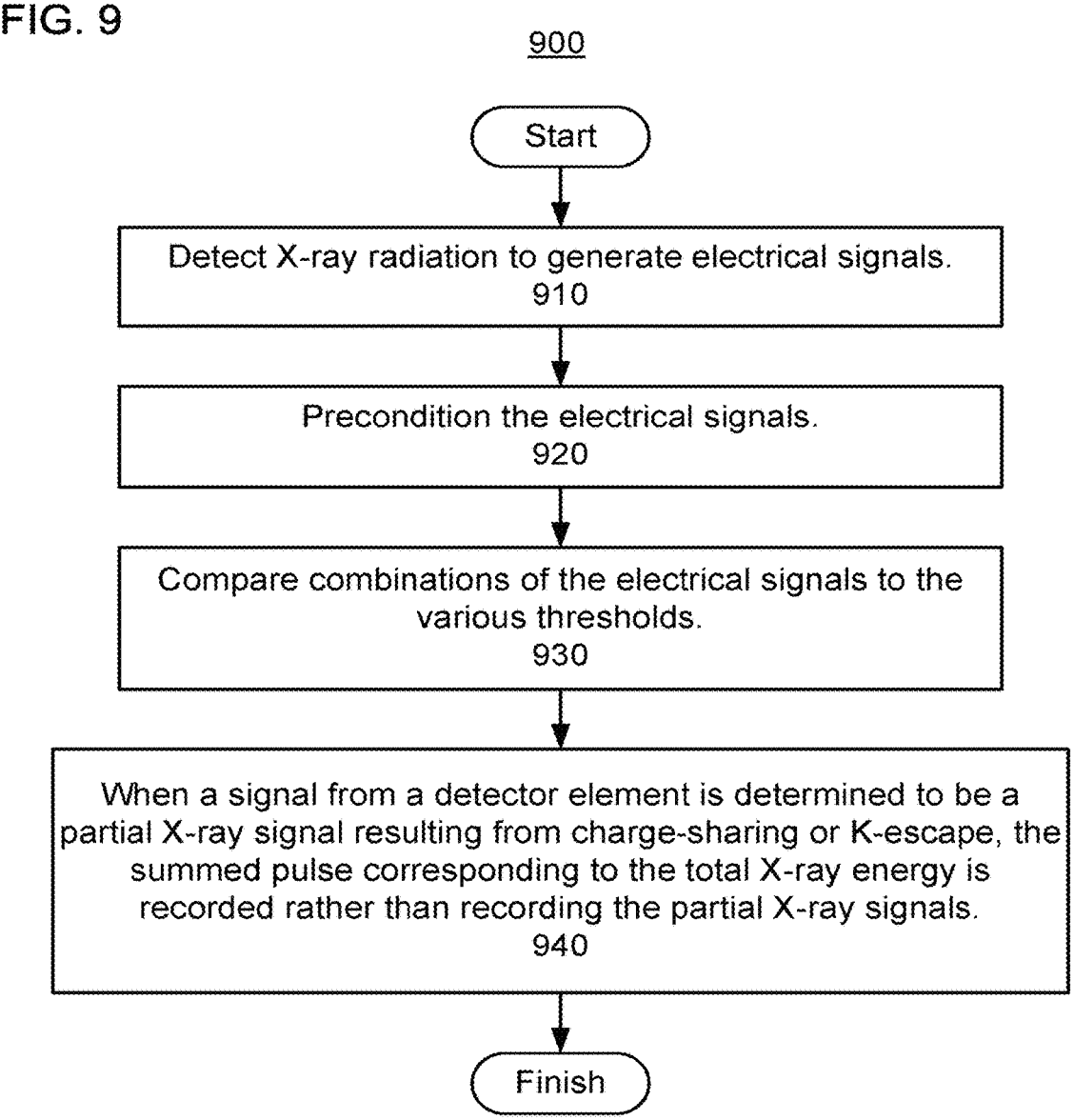
FIG. 9 show a flow diagram of a method of determining whether a distributed detection event has occurred and then resolving and recording the energy of the detection event, according to one implementation.

FIG. 9 shows a flow diagram of a method performed by the ASIC 400 to process signals transmitted by detector elements of a PCD array.

In step 910 of method 900, X-ray radiation is detected, generating electrical signals, and the electrical signals are grouped into channels corresponding groups of detector elements sharing adjacent edges between various pairs within the group. The electrical signals within a channel include signals from pairs of detector elements within the group that have adjacent edges that are susceptible charge sharing and/or K-escape, potential creating an ambiguity whether two simultaneously detected signals arose from two separate detection events or from a single detection event creating a distributed-detection event. The number of detector elements within a group can be any integer greater than two.

In step 920 of method 900, the signal from the respective detector elements are preconditioned. For example, the signals can be preamplified and pulse shaped, as discussed above in reference to FIG. 4B. Further, summed pulses can be generated for pairs of adjacent detector elements that are susceptible to charge sharing and/or K-escape.

In step 930 of method 900, the signal from the respective detector elements are each compared to a series of thresholds including three or more threshold values.

In step 940 of method 900, if a signal from a detector element is determined to be a partial X-ray signal resulting from charge-sharing or K-escape, the summed pulse corresponding to the total X-ray energy is recorded rather than the partial X-ray signals corresponding to the respective detector elements taken separately. For example, if the detector element that was determined to have generated a partial X-ray signal is separately adjacent to two different detector elements, only one of which recorded a pulse within the detection time-window, then the summed pulse will be the combination from the two detector elements registering simultaneous detection events within the detection time-window. In certain implementations, if the detector element that was determined to have generated a partial X-ray signal is separately adjacent to two different detector elements that each register a pulse within the detection time-window, then no detection pulse is recorded unless the ambiguity can be resolved regarding which pair among the three registered signals is to be summed to provide the total X-ray energy of the distributed-detection event.

Figure 10:
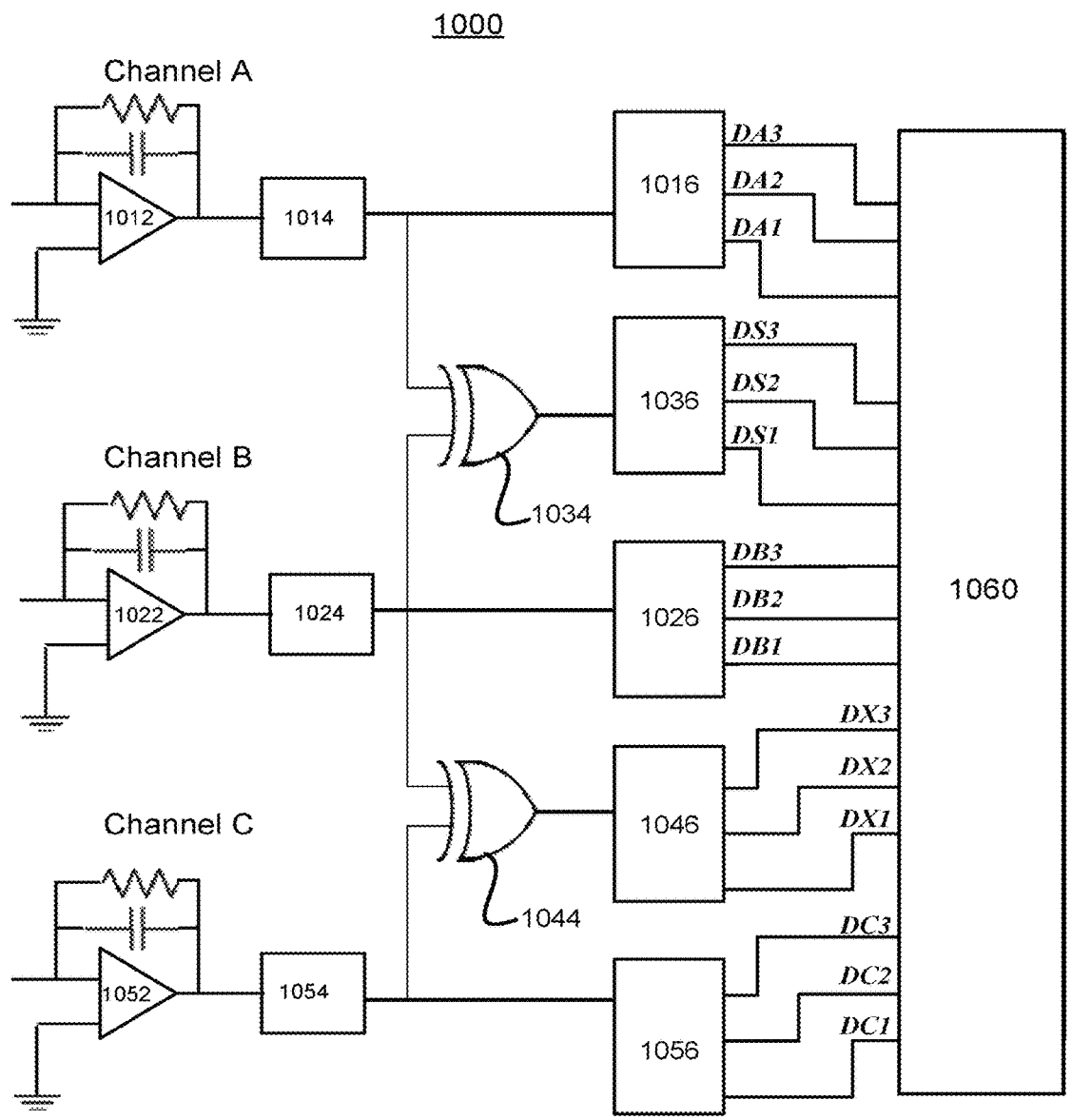
FIG. 10 shows a circuit diagram of a three-channel ASIC for differentiating a distributed detection of a single X-ray across three detector elements, according to one implementation.

FIG. 10 shows a schematic diagram of an ASIC 1000 that is similar to ASIC 400, except ASIC 400 has only two channels-A and B-whereas ASIC 1000 has three channels— A, B, and C. Like ASIC 400, ASIC 1000 has a preamplifier for each channel. The preamplifiers are identified as preamplifier 1012, preamplifier 1022, and preamplifier 1052 for channels A, B, and C respectively. Additionally, ASIC 1000 has a beam shaper for each of the channels, wherein each beam shaper modifies the pulse coming out of the corresponding preamplifier according to a predefined impulse response function in order to shape the pulse and restore the pulse baseline for each channel. The beam shapers are identified as beam shaper 1014, beam shaper 1024, and beam shaper 1054 for channels A, B, and C respectively. Each channel also includes a comparator; these are comparator 1016, comparator 1026, and comparator 1056 respectively corresponding to channels A, B, and C. The comparators 1016, 1026, 1036, 1046, and 1056 each can operator according to the description of comparators described above for ASIC 400. Additionally, ASIC 1000 includes two analog summing circuits 1034 and 1044, which operator according to the description of the analog summing circuit 434 of ASIC 400. Analog summing circuit 1034 combines the signals from channels A and B, whereas analog summing circuit 1034 combines the signals from channels B and C. Finally, the counter 1060 receives the outputs of the comparators 1016, 1026, 1036, 1046, and 1056 determines how the counts should be recorded and to which channels each count should be attributed, as described above.

Figure 11:
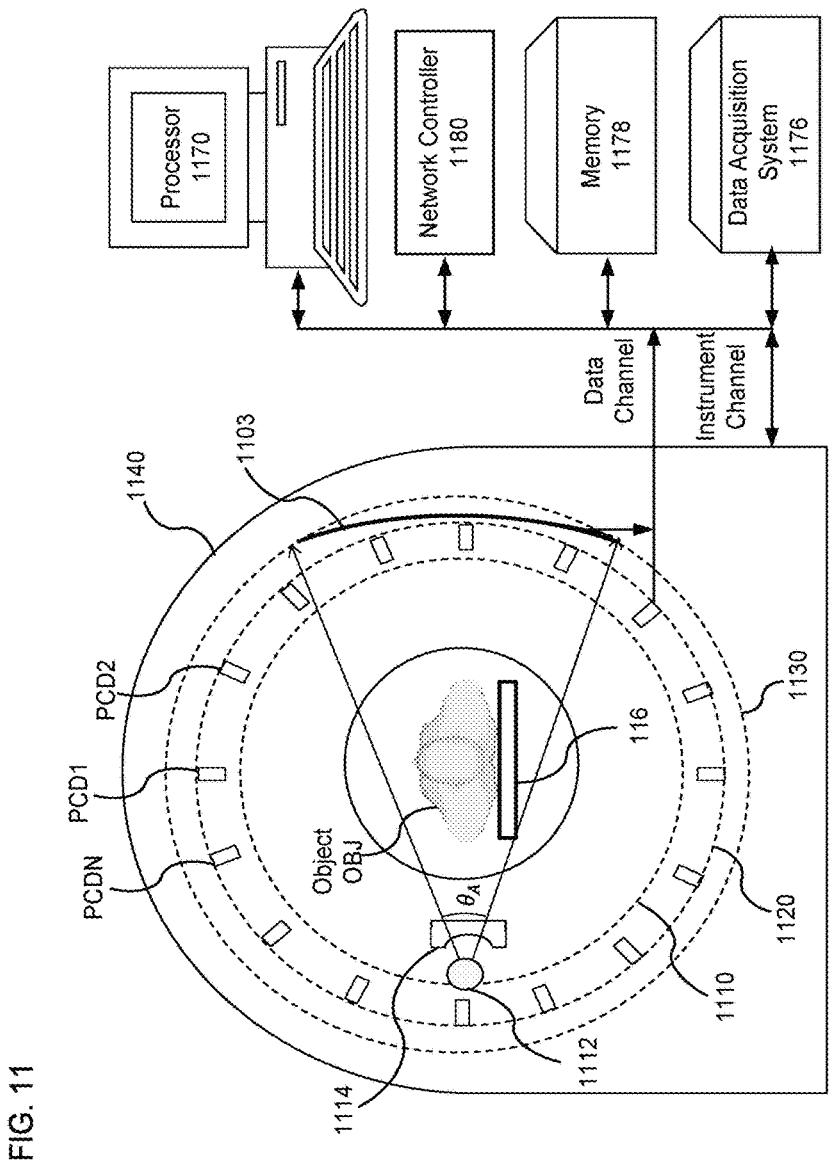
FIG. 11 shows a schematic of an implementation of a CT scanner, according to one implementation.

FIG. 11 shows a computed tomography (CT) scanner having both energy-integrating detectors arranged in a third-generation geometry and PCDs arranged in a fourth-generation geometry. Illustrated in FIG. 11 is an implementation for placing the PCDs in a predetermined fourth-generation geometry in combination with a detector unit 1103 in a predetermined third-generation geometry in a CT scanner system. The diagram illustrates relative positions among the X-ray source 1112, the collimator/filter 1114, the X-ray detector 1103, and the photon-counting detectors PCD1 through PCDN.

Also shown in FIG. 11 is circuitry and hardware for acquiring, storing, processing, and distributing X-ray projection data. The circuitry and hardware include: a processor 1170, a network controller 1180, a memory 1178, and a data acquisition system 1176.

In one alternative implementation, the CT scanner includes PCDs but does not include the energy-integrating detector unit 1103.

As the X-ray source 1112 and the detector unit 1103 are housed in a gantry 1140 and rotate around circular paths 1110 and 130 respectively, the photon-counting detectors PCDs and the detector unit 1103 respectively detects the transmitted X-ray radiation during data acquisition. The photon-counting detectors PCD1 through PCDN intermittently detect the X-ray radiation that has been transmitted and individually output a count value representing a number of photons, for each of the predetermined energy bins. On the other hand, the detector elements in the detector unit 1103 continuously detect the X-ray radiation that has been transmitted and output the detected signals as the detector unit 1103 rotates. In one implementation, the detector unit 1103 has densely placed energy-integrating detectors in predetermined channel and segment directions on the detector unit surface.

In one implementation, the X-ray source 1112, the PCDs and the detector unit 1103 collectively form three predetermined circular paths that differ in radius. At least one X-ray source 1112 rotates along a first circular path 1110 while the photon-counting detectors are sparsely placed along a second circular path 120. Further, the detector unit 1103 travels along a third circular path 130. The first circular path 1110, second circular path 120, and third circular path 130 can be determined by annular rings that are rotatably mounted to the gantry 1140.

There are other alternative embodiments for placing the photon-counting detectors in a predetermined fourth-generation geometry in combination with the detector unit in a predetermined third-generation geometry in the CT scanner. Several alternative embodiments of the X-ray CT Scanner as described in U.S. patent application Ser. No. 13/029,1097, herein incorporated by reference in its entirety.

In one implementation, the X-ray source 1112 is optionally a single energy source. In another implementation, the X-ray source 1112 is configured to perform a kV-switching function for emitting X-ray radiation at a predetermined high-level energy and at a predetermined low-level energy. In still another alternative embodiment, the X-ray source 1112 is a single source emitting a broad spectrum of X-ray energies. In still another embodiment, the X-ray source 1112 includes multiple X-ray emitters with each emitter being spatially and spectrally distinct.

The detector unit 1103 can use energy-integrating detectors such as scintillation elements with photo-multiplier tubes or avalanche photo-diodes to detect the resultant scintillation photons from scintillation events resulting from the X-ray radiation interacting with the scintillator elements. The scintillator elements can be crystalline, an organic liquid, a plastic, or other know scintillator.

The PCDs can use a direct X-ray radiation detectors based on semiconductors, such as cadmium telluride (CdTe), cadmium zinc telluride (CZT), silicon (Si), mercuric iodide ($HgI_2$), and gallium arsenide (GaAs).

The CT scanner also includes a data channel that routes projection measurement results from the photon-counting detectors and the detector unit 1103 to a data acquisition system 1176, a processor 1170, memory 1178, network controller 1180. The data acquisition system 1176 controls the acquisition, digitization, and routing of projection data from the detectors. The data acquisition system 1176 also includes radiography control circuitry to control the rotation of the annular rotating frames 1110 and 130. In one implementation data acquisition system 1176 will also control the movement of the bed 1116, the operation of the X-ray source 1112, and the operation of the X-ray detectors 1103. The data acquisition system 1176 can be a centralized system or alternatively it can be a distributed system. In an implementation, the data acquisition system 1176 is integrated with the processor 1170. The processor 1170 performs functions including reconstructing images from the projection data, pre-reconstruction processing of the projection data, and post-reconstruction processing of the image data.

In certain implementations, the ASIC 400 can be packaged together with the PCDs. Additionally, in certain implementations, the ASIC 400 can be combined together with the data acquisition system 1176. In certain implementations, the ASIC 400 can be distributed between the data acquisition system 1176, the data channel and the PCDs. For example, in certain implementations, the preamplifier can be co-located with the PCDs within the gantry 1140, and the comparators 416, 426, and 436 can be located with the data acquisition system 1176. The pulse shapers 414 and 424 and the analog summing circuit 434 can be either located with the PCDs or with the data acquisition system 1176, or along the data channel. As would be understood by one of ordinary skill in the art, the ASIC 400 can be located and/or distributed among any of the locations from the PCDs to the data acquisition system 1176.

Post-reconstruction processing can include filtering and smoothing the image, volume rendering processing, and image difference processing as needed. The image reconstruction process can be performed using filtered back projection, iterative image reconstruction methods, or stochastic image reconstruction methods. Both the processor 1170 and the data acquisition system 1176 can make use of the memory 1176 to store, e.g., projection data, reconstructed images, calibration data and parameters, and computer programs.

The processor 1170 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the reconstruction processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display. The display can be an LCD display, CRT display, plasma display, OLED, LED or any other display known in the art.

The memory 1178 can be a hard disk drive, CD-ROM drive, DVD drive, FLASH drive, RAM, ROM or any other electronic storage known in the art.

The network controller 1180, such as an Intel Ethernet PRO network interface card from Intel Corporation of America, can interface between the various parts of the CT scanner. Additionally, the network controller 1180 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

Further, in certain implementations, the CT scanner can omit energy-integrating detector elements, and can include PCDs arranged in a two-dimensional array in a third-generation geometry.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:
1. An apparatus, comprising:
a first element of a radiation detector configured to detect radiation and generate a first electrical signal, a magnitude of the first electrical signal representing an energy of the radiation detected by the first element;

a second element of the radiation detector configured to detect the radiation by converting the radiation into a second electrical signal, a magnitude of the second electrical signal representing an energy of the radiation detected by the second element;

a summing circuit configured to sum the first electrical signal and the second electrical signal to generate a combined electrical signal;

a first comparator configured to compare the magnitude of the first electrical signal with a plurality of thresholds to generate a first comparator signal;

a second comparator configured to compare the magnitude of the second electrical signal with the plurality of thresholds to generate a second comparator signal;

a third comparator configured to compare a magnitude of the combined electrical signal with the plurality of thresholds to generate a third comparator signal; and a counter configured to
receive the first comparator signal, the second comparator signal, and the third comparator signal, and
record the third comparator signal as representing the energy of the radiation, when both the first comparator signal and the second comparator signal exceed a first threshold of the plurality of thresholds and at least one of the first comparator signal and the second comparator signal indicates a partial-detection magnitude.

2. The apparatus according to claim 1, wherein the counter is further configured to
record the first comparator signal as representing the energy of the radiation detected by the first element, when neither the first comparator signal nor the second comparator signal is determined to indicate the partial-detection magnitude, and the first comparator signal indicates that the magnitude of the first electrical signal is greater than the partial-detection magnitude, and
record the second comparator signal as representing the energy of the radiation detected by the second element, when neither the first comparator signal nor the second comparator signal is determined to indicate the partial-detection magnitude, and the second comparator signal indicates that the magnitude of the second electrical signal is greater than the partial-detection magnitude.

3. The apparatus according to claim 1, wherein the radiation is an X-ray, and the radiation detector detects the X-ray.

4. The apparatus according to claim 3, wherein the counter is further configured to determine that one of the first comparator signal and the second comparator signal indicates the partial-detection magnitude, when
the first comparator signal represents that a magnitude of the first electrical signal is below a partial-detection threshold of the plurality of thresholds, and
the first electrical signal is greater than or equal to an electrical-noise threshold of the plurality of thresholds, the electrical-noise threshold being the first threshold of the plurality of thresholds, wherein
the partial-detection threshold represents at least one of a threshold greater than a maximum energy of a fluorescence X-ray and a threshold greater than a predefined upper limit for a smaller of two electrical pulses generated by energy sharing of an X-ray detection event.

5. The apparatus according to claim 3, wherein the first, second and third comparators perform comparisons using the plurality of thresholds the includes
a first threshold that is at an X-ray energy that is greater than an energy-spectrum maximum of electronic noise of the first detector element and the second detector element,
greater than an energy-spectrum maximum of weighting cross-talk among detector elements of the radiation detector, and
less than all other thresholds of the plurality of thresholds, and
a second threshold that is at an X-ray energy that is greater than a maximum fluorescence X-ray energy determined by a combination of a semiconductor material of the radiation detector and a spectrum of the radiation, and
less than all other thresholds of the plurality of thresholds except the first threshold.

6. The apparatus according to claim 1, further comprising a plurality of elements of the radiation detector, including the first element and the second element, the plurality of elements being arranged in an array in a longitudinal direction along the radiation detector.

7. The apparatus according to claim 6, wherein a first side of the first element is adjacent to a first side of the second element, a direction of separation between the first side of the first element and the first side of the second element being in the longitudinal direction.

8. The apparatus according to claim 6, wherein a first side of the first element is adjacent to a first side of the second element, a direction of separation between the first side of the first element and the first side of the second element being transverse to the longitudinal direction.

9. The apparatus according to claim 6, further comprising:
a third element of the plurality of elements of the radiation detector, the third element configured to detect the radiation and generate a third electrical signal, a magnitude of the third electrical signal representing an energy of the radiation detected by the third element;
another summing circuit configured to sum the third electrical signal and the second electrical signal to generate another combined electrical signal;
a fourth comparator configured to compare the magnitude of the another combined electrical signal with the plurality of thresholds to generate a fourth comparator signal; and
a fifth comparator configured to compare the magnitude of the third electrical signal with the plurality of thresholds to generate a fifth comparator signal, wherein
the first element is on a first side of the second element and the third element is on a second side of the second element that is opposite to the first side of the second element, such that the first element and the third element are respectively adjacent to the second element, but are respectively on opposite sides of the second element, and
the counter is further configured to
receive the first comparator signal, the second comparator signal, the third comparator signal, the fourth comparator signal, and the fifth comparator signal,
record the third comparator signal as representing the energy of the radiation, when at least one of the first comparator signal, and the second comparator signal has the partial-detection magnitude and the fifth comparator signal indicates an absence of the radiation at the third element, and
record the fourth comparator signal as representing the energy of the radiation, when at least one of the fifth comparator signal, and the second comparator signal has the partial-detection magnitude of the corresponding electrical signal and the first comparator signal indicates an absence of the radiation at the first element.

10. The apparatus according to claim 1, further comprising:
a first masking member configured to attenuate radiation from entering the radiation detector at a first edge of the first detector element, and
a second masking member configured to attenuate radiation from entering the radiation detector at a first edge of the second detector element, wherein
a second edge of the first element is adjacent to a second edge of the second element, the first edge of the first element being opposite from the second edge of the first element, and the first edge of the second element being opposite from the second edge of the second element.

11. The apparatus according to claim 10, wherein the first masking member and the second masking member are anti-scatter grids or collimators.

12. The apparatus according to claim 1, wherein the first element and the second element have a common cathode through which the radiation is transmitted, and the first element includes an anode that is separate from an anode of the second element.

13. The apparatus according to claim 1, wherein the counter is further configured to
record the third comparator signal as representing the energy of the radiation of the detected by the first element when the first comparator signal is greater than the partial-detection magnitude and the second comparator signal indicates the partial-detection magnitude,
record the third comparator signal as representing the energy of the radiation detected by the second element when the second comparator signal is greater than the partial-detection magnitude and the first comparator signal indicates the partial-detection magnitude, and
record, according to a predetermined tie-breaking criteria, the third comparator signal as representing the energy of the radiation detected by one of the first element and the second element when both the first comparator signal indicates the partial-detection magnitude and the second comparator signal indicates the partial-detection magnitude.

14. The apparatus according to claim 1, wherein
the second comparator is determined to indicate the partial-detection magnitude when the second comparator signal indicates that that the magnitude of the second electrical signal is greater than a first threshold of the plurality of thresholds and less than a second threshold of the plurality of thresholds,
the first comparator is determined to indicate the partial-detection magnitude when the first comparator signal indicates that that the magnitude of the first electrical signal is greater than the first threshold of the plurality of thresholds and less than the second threshold of the plurality of thresholds.

15. The apparatus according to claim 1, further comprising:
a first preamplifier configured to amplify the first electrical signal; and
a second preamplifier configured to amplify the second electrical signal;

a first pulse shaper configured to modify a pulse shape of the first electrical signal according to a predefined linear-impulse-response function; and
a second pulse shaper configured to modify a pulse shape of the second electrical signal according to the predefined linear-impulse-response function.

16. The apparatus according to claim 1, wherein the counter is further configured to
record the third comparator signal as representing the energy of the radiation detected at the first element, when the second comparator signal indicates the partial-detection magnitude, and the first comparator signal indicates that the magnitude of the first electrical signal is greater than the partial-detection magnitude, and
record the third comparator signal as representing the energy of the radiation detected at the second element, when the first comparator signal indicates the partial-detection magnitude, and the second comparator signal indicates that the magnitude of the second electrical signal is greater than the partial-detection magnitude.

17. An apparatus, comprising:
an X-ray source to radiate X-rays;
a radiation detector, including a plurality of detector elements, configured to detect the X-rays radiated from the X-ray source and generate projection data, the radiation detector including
a first element of the plurality of detector elements, the first element being configured to generate a first electrical signal, a magnitude of the first electrical signal representing respective energies of the X-rays detected by the first element,
a second element of the plurality of detector elements, the second element being configured to generate a second electrical signal, a magnitude of the second electrical signal representing respective energies of the X-rays detected by the second element,
a summing circuit configured to sum the first electrical signal and the second electrical signal to generate a combined electrical signal,
a first comparator configured to compare the magnitude of the first electrical signal with a plurality of thresholds to generate a first comparator signal,
a second comparator configured to compare the magnitude of the second electrical signal with the plurality of thresholds to generate a second comparator signal,
a third comparator configured to compare a magnitude of the combined electrical signal with the plurality of thresholds to generate a third comparator signal, and
a counter configured to
receive the first comparator signal, the second comparator signal, and the third comparator signal, and
record, as projection data, the third comparator signal as representing the energy of an X-ray of the detected X-rays, when at least one of the first comparator signal and the second comparator signal indicates a partial-detection magnitude; and
processing circuitry configured to reconstruct a tomographic image using the projection data.

18. The apparatus according to claim 17, wherein the counter of the radiation detector is further configured to
record the first comparator signal as representing the energy of an X-ray of the X-rays detected by the first element, when neither the first comparator signal nor the second comparator signal is determined to indicate the partial-detection magnitude, and the first comparator signal indicates that the magnitude of the first electrical signal is greater than the partial-detection magnitude, and record the second comparator signal as representing the energy of an X-ray of the X-rays detected by the second element, when neither the first comparator signal nor the second comparator signal is determined to indicate the partial-detection magnitude, and the second comparator signal indicates that the magnitude of the second electrical signal is greater than the partial-detection magnitude.

19. A method, comprising:

receiving a first electrical signal, a magnitude of the first electrical signal representing an energy of an X-ray detected by a first element of an X-ray detector;

receiving a second electrical signal, a magnitude of the second electrical signal representing an energy of an X-ray detected by a second element of the X-ray detector;

summing the first electrical signal and the second electrical signal to generate a combined electrical signal;

comparing the magnitude of the first electrical signal with a plurality of thresholds to generate a first comparator signal;

comparing the magnitude of the second electrical signal with the plurality of thresholds to generate a second comparator signal;

comparing the magnitude of the combined electrical signal with the plurality of thresholds to generate a third comparator signal;

recording the third comparator signal as representing one of the energy of the X-ray of detected by the first element of the X-ray detector and the energy of the X-ray of detected by the second element of the X-ray detector, when at least one of the first comparator signal and the second comparator signal indicates a partial-detection magnitude; and reconstructing an computed tomography image based on the recorded third comparator signal.

20. A non-transitory computer readable storage medium including executable instruction, wherein the instructions, when executed by circuitry, cause the circuitry to perform the method according to claim 19.

* * * * *